(12) United States Patent
Tojo

(10) Patent No.: US 7,876,471 B2
(45) Date of Patent: Jan. 25, 2011

(54) IMAGE PROCESSING APPARATUS, CONTROL METHOD AND PROGRAM THEREOF WHICH SEARCHES FOR CORRESPONDING ORIGINAL ELECTRONIC DATA BASED ON A PAPER DOCUMENT

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 990 days.

(21) Appl. No.: 11/459,995

(22) Filed: Jul. 26, 2006

(65) Prior Publication Data

US 2007/0030519 A1     Feb. 8, 2007

(30) Foreign Application Priority Data

Aug. 8, 2005     (JP)     .............................. 2005-230088

(51) Int. Cl.
*G06F 3/12*     (2006.01)
(52) U.S. Cl. ........................ 358/1.18; 358/1.1; 358/1.15; 358/1.17; 382/174; 382/180; 382/190; 382/195
(58) Field of Classification Search ......... 358/1.1–1.18, 358/2.1; 382/174–180, 190–195
See application file for complete search history.

(56) References Cited

U.S. PATENT DOCUMENTS

| 6,104,833 | A | * | 8/2000 | Naoi et al. ................... 382/190 |
| 7,280,693 | B2 | * | 10/2007 | Kurokawa et al. ........... 382/173 |
| 7,623,259 | B2 | * | 11/2009 | Tojo ........................... 358/1.15 |
| 2004/0234169 | A1 | * | 11/2004 | Tojo ........................... 382/305 |
| 2007/0030519 | A1 | * | 2/2007 | Tojo ........................... 358/1.18 |
| 2008/0089564 | A1 | * | 4/2008 | Sato et al. ................... 382/124 |

FOREIGN PATENT DOCUMENTS

| JP | 05-135174 A | 6/1993 |
| JP | 11-328417 | 11/1999 |
| JP | 2005-149323 A | 6/2005 |

OTHER PUBLICATIONS

The above references wer cited in a Nov. 19, 2010 Japanese Office Action, a copy of which is enclosed without English Translation, that issued in Japanese Patent Application No. 2005-230088.

* cited by examiner

*Primary Examiner*—Benny Q Tieu
*Assistant Examiner*—Marcellus Augustin
(74) *Attorney, Agent, or Firm*—Cowan, Liebowitz & Latman, P.C.

(57) ABSTRACT

Printed material is electronically read, and electronic data of that printed material is input as a comparison source image. From the comparison source image, a plurality of partial regions are extracted. Layout comparison between partial regions of the comparison source image and a comparison destination image stored in a storage unit is executed under a condition in which the positional deviation amount in the center of gravity direction of an image is looser than those in other directions.

9 Claims, 20 Drawing Sheets

FIG. 4

| DOCUMENT ID | ADDRESS |
|:---:|:---:|
| 001 | ¥¥abc¥doc¥ship.doc |
| 002 | C:¥img¥car.bmp |

FIG. 5

| NUMBER OF BLOCKS | BLOCK ANGLE | BLOCK DISTANCE RATIO | DOCUMENT ID, PAGE NUMBER GROUP |
|---|---|---|---|
| 2 | $\theta_1, \theta_2$ | $R_1 : R_2$ | (001, 1), (001, 2), (002, 1), ... |
| 3 | $\theta_1, \theta_3, \theta_4$ | $R_1 : R_3 : R_4$ | (003, 1), (004, 3), (005, 1), ... |

FIG. 6

| DOCUMENT ID | PAGE NUMBER | BLOCK ID | BLOCK UNIT DISTANCE | ASPECT RATIO | SIZE | TYPE | FEATURE AMOUNT |
|---|---|---|---|---|---|---|---|
| 001 | 1 | 001 | 50 | 2:3 | 10 | TEXT | ... |
| 001 | 2 | 002 | 30 | 2:5 | 15 | IMAGE | ... |
| 002 | 1 | 001 | 40 | 1:3 | 20 | IMAGE | ... |

F I G. 8
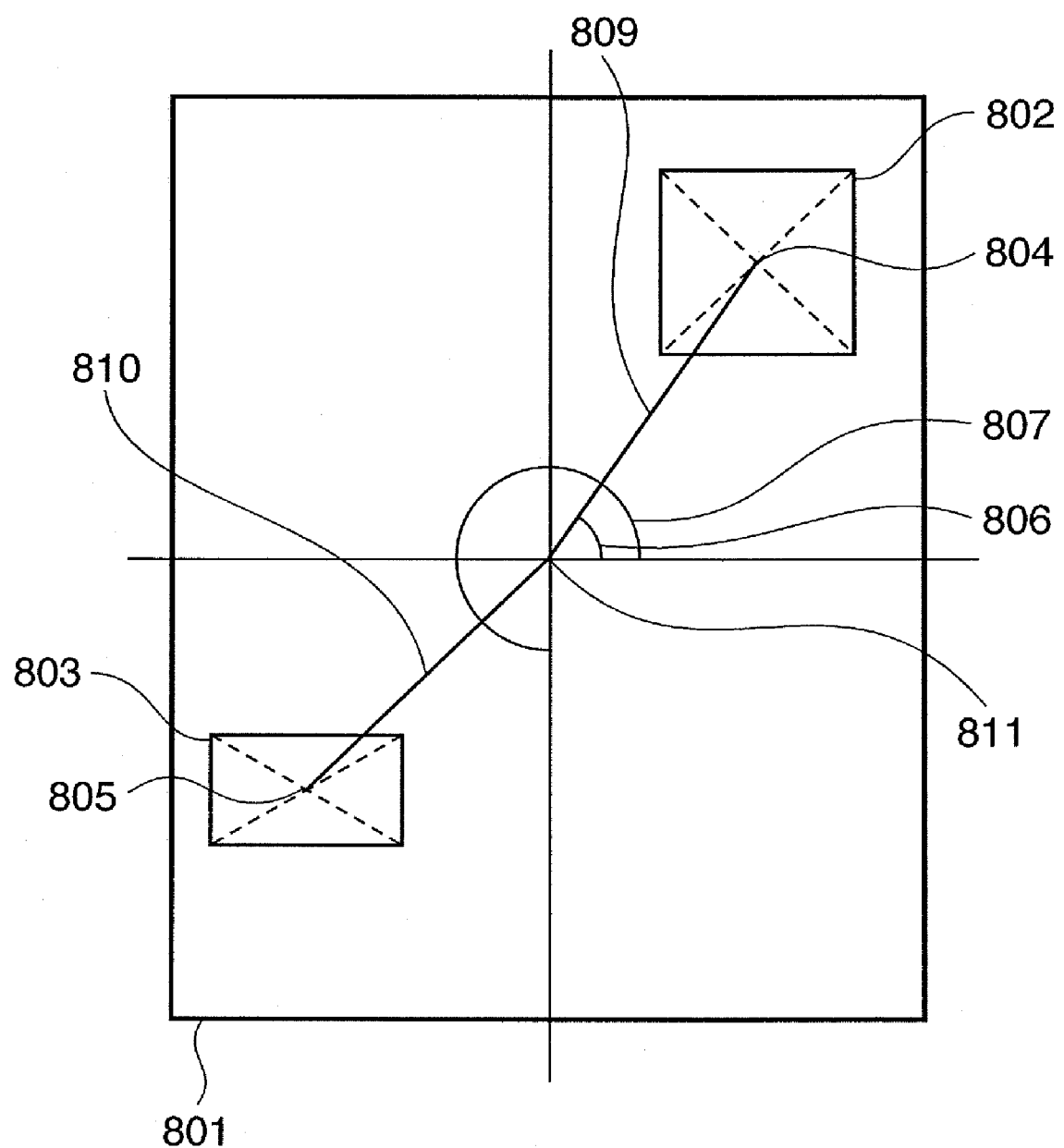

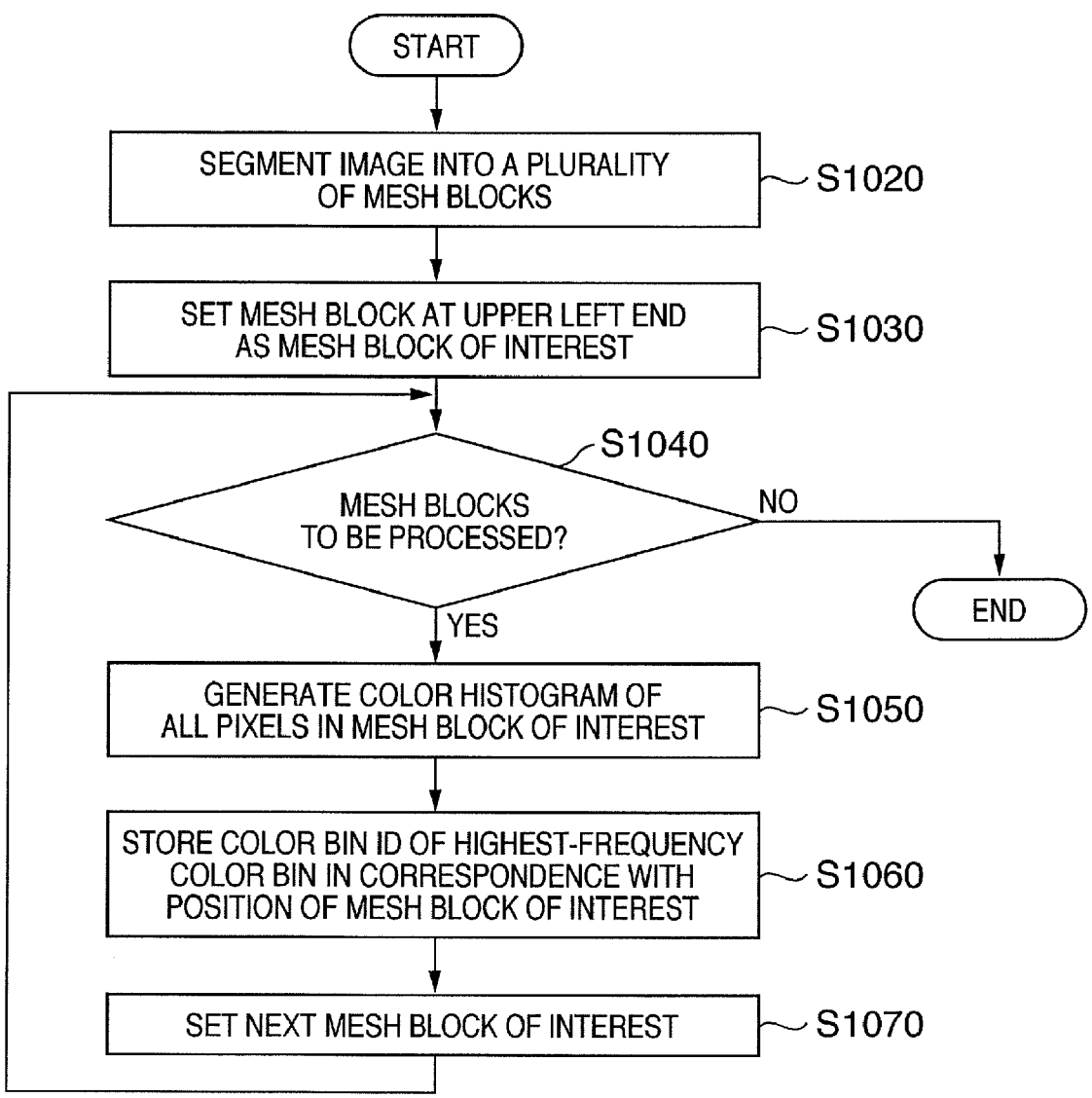

FIG. 17

|   | 1 | 2 | 3 | 4 | 5 | 6 | 7 | 8 | · · · · · |
|---|---|---|---|---|---|---|---|---|---|
| 1 | 0 | 1 | 1 | 5 | 1 | 5 | 7 | 7 | · · · · · |
| 2 |   | 0 | 2 | 1 | 1 | 7 | 2 | 5 | · · · · · |
| 3 |   |   | 0 | 7 | 1 | 1 | 5 | 2 | · · · · · |
| 4 |   |   |   | 0 | 1 | 9 | 1 | 7 | · · · · · |
| ⋮ |   |   |   |   |   |   |   |   |   |

IMAGE PROCESSING APPARATUS, CONTROL METHOD AND PROGRAM THEREOF WHICH SEARCHES FOR CORRESPONDING ORIGINAL ELECTRONIC DATA BASED ON A PAPER DOCUMENT

BACKGROUND OF THE INVENTION

1. Field of the Invention

The present invention relates to an image processing apparatus which searches for corresponding original electronic data based on a paper document read by an image input apparatus such as a copying machine or the like, and allows to utilize the original electronic data in printing, distribution, storage, editing, and the like, a control method thereof, and a program.

2. Description of the Related Art

In recent years, along with the advance of digitization, documents are stored in a database as electronic files. A demand for searching electronic files on the database based on a scan image of a printed document by a simple operation is increasing. As a method of meeting such demand, a method of analyzing a layout indicating the positional relationship of a text region and image region included in a document image, and comparing the layouts has been proposed. Japanese Patent Application Laid-Open No. 11-328417 discloses a method of segmenting a document image into regions, and comparing features of documents which have the same numbers of regions using the number of regions as a narrowing-down condition.

However, printed material normally includes print margins, and blank spaces for the margins are formed around a document region of the printed material unlike a document region for one page on an electronic file. Upon printing on a print paper size different from that set upon creation of an electronic file, reduction must be made to print without changing the entire document region of the electronic file. In this case as well, blank spaces are formed around the document region.

This fact will be described in more detail below using FIG. 7.

Reference numeral 701 denotes an original image obtained by rasterizing an electronic file document created using word-processing software or the like. The original image includes image or text regions 702 and 703.

By contrast, reference numeral 706 denotes a scan image obtained by printing the original image 701 of the electronic document file and scanning the printed image using a scanner. As the scan image 706 includes blank spaces (715, 716) due to print margins and the like, a document region 707 is slightly reduced compared to the original image 701.

As a result, the image or text regions 702 and 703 included in the original image 701 respectively correspond to regions 708 and 709 in the scan image 706, which are reduced a little. In addition, the positions of these regions 708 and 709 deviate in the direction of a center of gravity 714 of the scan image 706.

Reference numeral 704 denotes the center of gravity of the text region 702. Reference numeral 705 denotes the center of gravity of the image or text region 703. The same positions as these center of gravities are plotted at positions 712 and 713 in the scan image 706. By contrast, center of gravities 710 and 711 of the image or text regions 708 and 709 deviate in the direction of the center of gravity 714.

In this manner, since the layouts of the original image 701 and scan image 706 suffer deviations, if layout comparison is executed between them, a high similarity cannot be obtained. If the condition is loosened to make ambiguous comparison so as to permit such deviations, even non-original images hit as candidates.

According to Japanese Patent Laid-Open No. 11-328417, respective regions are normalized using the size of the entire image so as to avoid the aforementioned influences of enlargement/reduction or the like.

However, since blank space regions due to the print margins and the like, which are not included in the original image, are formed around the document region on the scan image, as described above, if normalization is made using the size of the entire document, the deviations of the positions of the respective regions cannot be absorbed. Hence, in such case, even when layout comparison is executed, high precision cannot be obtained.

SUMMARY OF THE INVENTION

The present invention has been made in consideration of the above problems, and has as its object to provide an image processing apparatus which allows layout comparison with high precision even when an image to be compared includes blank space regions due to print margins and the like, a control method thereof, and a program.

According to the present invention, the foregoing object is attained by providing an image processing apparatus for executing similarity comparison processing of images, comprising:

storage means for storing a plurality of electronic data as comparison destination images;

input means for electronically reading printed material and inputting electronic data of the printed material as a comparison source image;

extraction means for extracting a plurality of partial regions from the comparison source image; and comparison means for executing layout comparison between the partial regions of the comparison source image and the comparison destination image under a condition in which a position deviation amount in a center of gravity direction of an image is looser than position deviation amounts in other directions.

In a preferred embodiment, the comparison means comprises:

calculation means for calculating a reduction ratio of a partial region of the comparison source image to a partial region of the comparison destination image based on a degree of positional deviation of the partial regions of the comparison source image and the comparison destination image, and the comparison means compares, as the layout comparison, a size obtained when the partial region of the comparison destination image is reduced based on the reduction ratio with a size of the partial image of the comparison source image.

In a preferred embodiment, the comparison means executes the layout comparison using, when a center of gravity of an entire image is defined as an origin, a center of gravity angle, an angle a line that connects the origin and the center of gravity of a partial region makes with a reference line, and a distance ratio of distances between center of gravities of the plurality of partial regions included in the entire image and the origin.

In a preferred embodiment, the comparison means executes the layout comparison using, when a center of gravity of an entire image is defined as an origin, a center of gravity angle, an angle a line that connects the origin and the center of gravity of a partial region makes with a reference line, and a distance between a center of gravity of the partial region and the origin.

In a preferred embodiment, the comparison means executes the layout comparison using an area of an overlapping region where partial regions of the comparison source image and the comparison destination image overlap.

In a preferred embodiment, the comparison means comprises:

determination means for determining whether or not center of gravities of partial regions of the comparison source image and the comparison destination image and a center of gravity of an image are located on an identical line; and calculation means for, when the determination means determines that the center of gravities are located on the identical line, calculating a reduction ratio of the partial region of the comparison source image to the partial region of the comparison destination image based on a degree of positional deviation between the center of gravities of the partial regions of the comparison source image and the comparison destination image, and the comparison means executes the layout comparison between a partial image obtained by reducing the partial region of the comparison destination image based on the reduction ratio, and the partial region of the comparison source image.

In a preferred embodiment, the apparatus further comprises:

first search means for searching the storage means for comparison destination images corresponding to the comparison source image based on a comparison result of the comparison means;

feature amount comparison means for executing feature amount comparison between partial regions of the comparison destination images found by the first search means and the comparison source image; and second search means for searching the comparison destination image found by the first search means for a comparison destination image corresponding to the comparison source image based on a comparison result of the feature amount comparison means.

According to the present invention, the foregoing object is attained by providing a method of controlling an image processing apparatus for executing similarity comparison processing of images, comprising:

an input step of electronically reading printed material and inputting electronic data of the printed material as a comparison source image;

an extraction step of extracting a plurality of partial regions from the comparison source image; and a comparison step of executing layout comparison between the partial regions of the comparison source image and a comparison destination image stored in a storage unit under a condition in which a position deviation amount in a center of gravity direction of an image is looser than position deviation amount in other directions.

According to the present invention, the foregoing object is attained by providing a program for making a computer execute similarity comparison processing of images, the program characterized by making the computer execute:

an input step of electronically reading printed material and inputting electronic data of the printed material as a comparison source image;

an extraction step of extracting a plurality of partial regions from the comparison source image; and a comparison step of executing layout comparison between the partial regions of the comparison source image and a comparison destination image stored in a storage unit under a condition in which a position deviation amount in a center of gravity direction of an image is looser than position deviation amount in other directions.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of address information according to the embodiment of the present invention;

FIG. 5 is a table showing an example of layout information according to the embodiment of the present invention;

FIG. 6 is a table showing an example of block information according to the embodiment of the present invention;

FIG. 8 is a view for explaining a coordinate system according to the embodiment of the present invention;

FIG. 10 is a flowchart showing details of color feature amount information extraction processing according to the embodiment of the present invention;

FIG. 17 shows an example of the configuration of a color pen penalty matrix according to the embodiment of the present invention;

DESCRIPTION OF THE EMBODIMENTS

Preferred embodiments of the present invention will be described in detail in accordance with the accompanying drawings.

Figure 1:
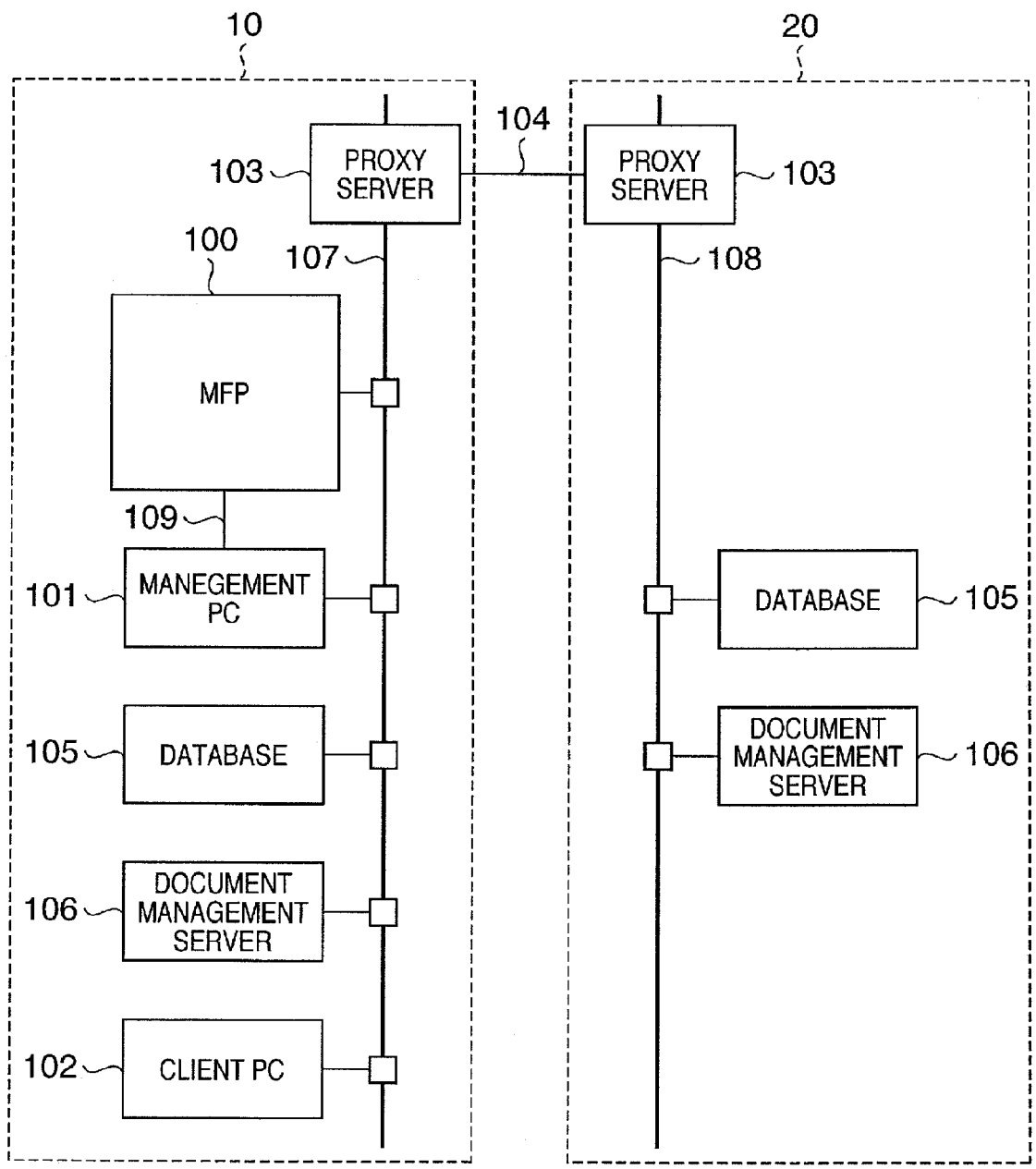
FIG. 1 is a block diagram showing the arrangement of an image processing system according to an embodiment of the present invention.

FIG. 1 is a block diagram showing the arrangement of an image processing system according to an embodiment of the present invention.

This image processing system is implemented in an environment in which offices 10 and 20 are connected via a network 104 such as the Internet or the like.

To a LAN 107 formed in the office 10, an MFP (Multi Function Peripheral) 100 as a multi-function peripheral equipment that implements a plurality of different functions is connected. Also, to this LAN 107, a management PC 101 used to control the MFP 100, a client PC 102, a document management server 106 and its database 105, and a proxy server 103 are connected.

The LAN 107 in the office 10 and a LAN 108 in the office 20 are connected to the network 104 via the proxy servers 103 of the two offices.

The MFP 100 especially has an image reading unit for electronically reading a paper document, and an image processing unit for applying image processing to an image signal obtained by the image reading unit. This image signal can be transmitted to the management PC 101 via a LAN 109.

The management PC 101 comprises a normal PC, which includes various building components such as an image storage unit, image processing unit, display unit, input unit, and the like. Some of these building components are integrally formed with the MFP 100.

Note that the network 104 is typically the Internet, LAN, WAN, or telephone line, a dedicated digital line, an ATM or frame relay line, a communication satellite line, a cable TV line, a data broadcast wireless line, and the like. The network 104 may be a so-called communication network implemented by a combination of them, and may allow data exchange.

Each of various terminals such as the management PC 101, client PC 102, document management server 106, and the like has standard building components equipped in a general-purpose computer. These standard building components include, e.g., a CPU, RAM, ROM, hard disk, external storage device, network interface, display, keyboard, mouse, and the like.

The detailed arrangement of the MFP 100 will be described below using FIG. 2.

Figure 2:
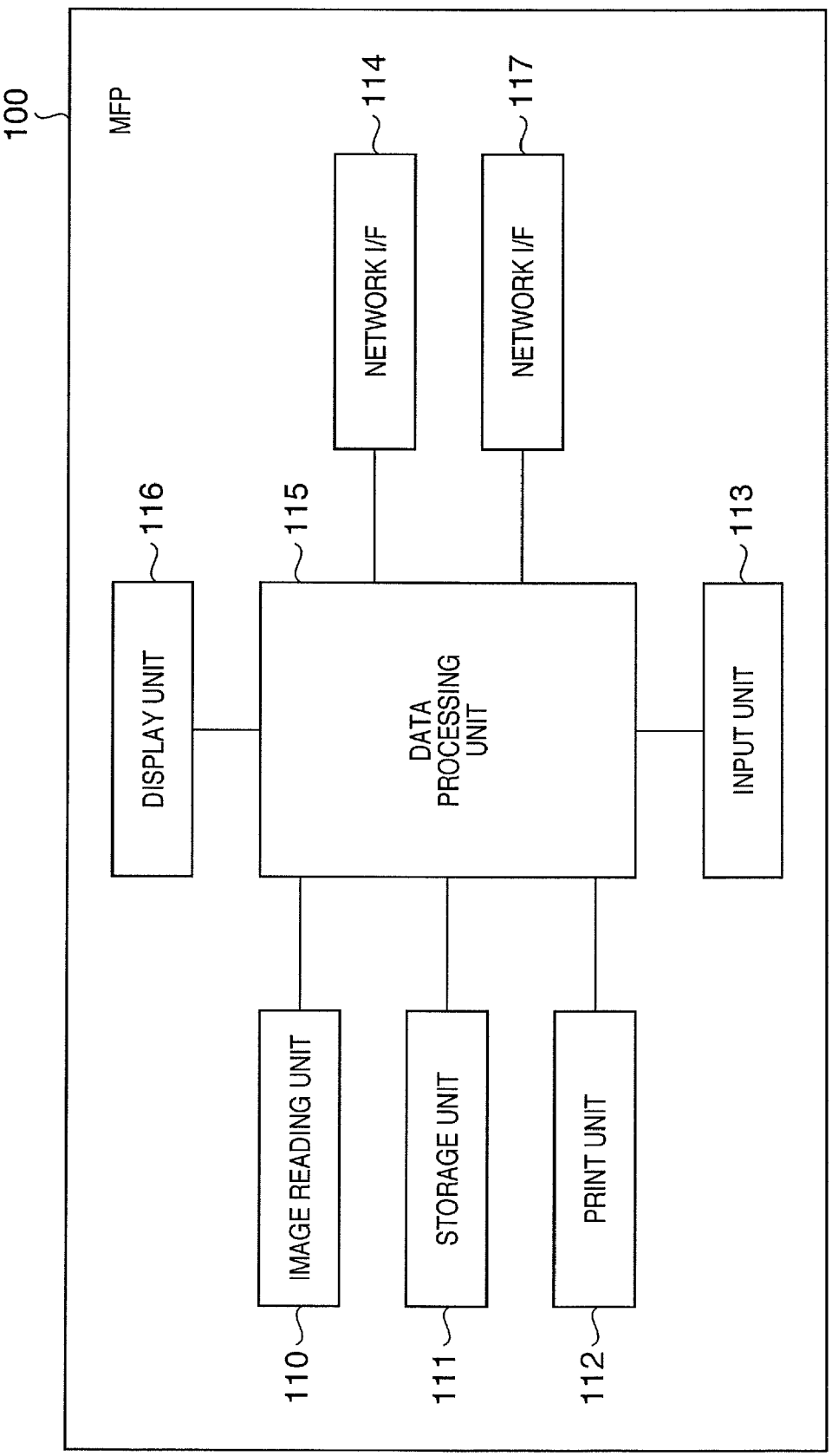
FIG. 2 is a block diagram showing the detailed arrangement of an MFP according to the embodiment of the present invention.

FIG. 2 is a block diagram showing the detailed arrangement of the MFP according to the embodiment of the present invention.

Referring to FIG. 2, an image reading unit 110 including a document table and an auto document feeder (ADF) irradiates a document image on each of one or a plurality of stacked documents with light coming from a light source, and forms an image of light reflected by the document on a solid-state image sensing element via a lens. As a result, the image reading unit 110 obtains a scan image signal in a raster order from the solid-state image sensing element as a raster image at a predetermined density (e.g., 600 DPI).

Also, the MFP 100 has a copying function of printing an image corresponding to the scan image signal on a print medium by a print unit 112. When a document image is to be copied on one sheet, a data processing unit 115 applies image processing to this scan image signal to generate a print signal, which is printed on a print medium by the print unit 112. On the other hand, when a document image is copied on a plurality of sheets, a print signal for one sheet is temporarily held by a storage unit 111, and is then sequentially output to the print unit 112, thus printing the image on print media.

The data processing unit 115 also receives a print signal output from the client PC 102 via the LAN 107 and a network I/F 114, and converts the print signal into raster data which can be printed by the print unit 112. After that, the print unit 112 prints that raster data on a print medium.

Operator's instructions to the MFP 100 are made from a key operation unit equipped on the MFP 100 and an input unit 113 which is connected to the management PC 101 and includes a keyboard and mouse. A series of these operations are controlled by a controller (not shown) in the data processing unit 115. The operation input state and image data whose processing is in progress are displayed on a display unit 116.

The storage unit 111 is also controlled from the management PC 101. Data exchange and control between the MFP 100 and the management PC 101 are done via a network I/F 117 and the LAN 109.

Note that the MFP 100 implements a user interface which provides various operations and displays required to execute various kinds of processing to be described later to the user by the display unit 116 and the input unit 113.

The processing to be executed by the image processing system according to the present invention roughly includes registration processing for registering image data, and search processing for searching for desired image data.

In this embodiment, in order to improve the processing efficiency of the entire image processing system, various kinds of processing to be described hereinafter are distributed to and executed by various terminals which constitute the image processing system, but they may be executed on a single terminal (e.g., the MFP 100).

The registration processing will be described first.

[Overview of Registration Processing]

Registration methods of image data to be registered include a case wherein image data generated by scanning a paper document is to be registered, and a case wherein image data which is obtained by rasterizing an electronic document created by a document creation application or the like to a raster image is to be registered.

An overview of the registration processing for registering an original document will be described below using FIG. 3A.

Figure 3A:
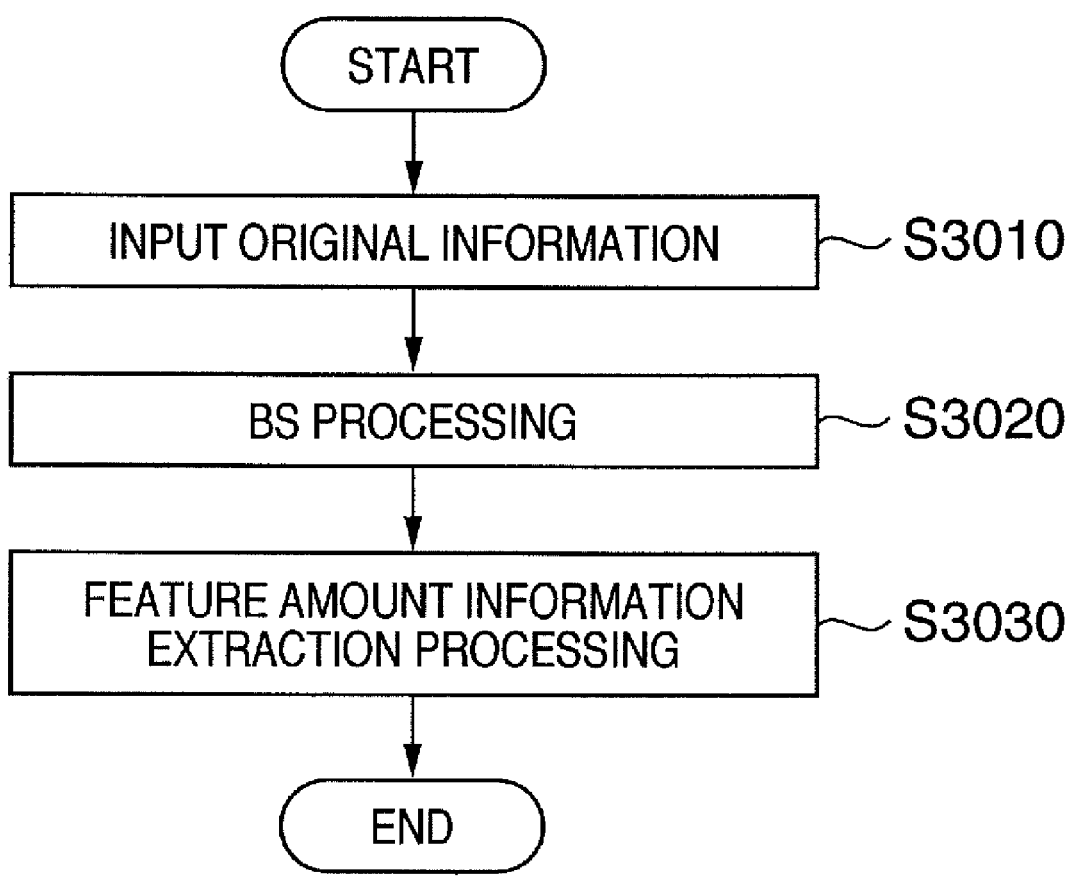
FIG. 3A is a flowchart showing registration processing according to the embodiment of the present invention.

FIG. 3A is a flowchart showing the registration processing according to the embodiment of the present invention.

Note that this processing is started when the user sets a paper document to be registered on the ADF of the image reading unit 110 and operates a registration button of the input unit 113. One or a plurality of pages of the paper document can be registered. When a plurality of pages of the paper document are to be registered, an image data group (page image group) obtained from that paper document is managed as one file.

In step S3010, an original document to be registered is input. Upon this input, various kinds of information required to manage the original document are generated and are stored in the storage unit 111.

Note that there are two different input methods of an original document upon registering the original document.

When the original document is electronic data, it is stored in any of the hard disk in the client PC 102, the database 105 in the document management server 106 in the office 10 or 20, and the storage unit 111 of the MFP 100. The electronic data of the original document to be registered is read out from such storage source, and is input to the data processing unit 115 via the network I/F 114. The data processing unit 115 converts that electronic data into a raster image.

On the other hand, when the original document is a paper document, the image reading unit 110 of the MFP 100 scans that paper document in a raster order to obtain a raster image.

In this manner, according to this embodiment, either the electronic data or paper document can be used as the original document to be registered. After that, the raster image undergoes pre-processing by the data processing unit 115, and is saved in the storage unit 111 (in the subsequent processing, in case of the paper document, that raster image is used as electronic data of the original document). At this time, a unique document ID is issued for each original document to be registered, and is saved in the storage unit 111 as address information in association with an address of the electronic data of the original document.

Note that the address is full-path information which is defined by a URL, or a server name and directory, and file name, and indicates the storage location of electronic data. An example of the address information is as shown in FIG. 4. As the storage location of the address information, the database 105, storage unit 111, and the like may be used.

Note that the file format of electronic data when the original document is a paper document is, for example, a BMP format. However, the present invention is not limited to this, and any other file formats (e.g., GIF, JPEG) may be used as long as they can save color information.

On the other hand, when the original document is electronic data, the file format of that electronic data is the one created by an application which created the electronic data. This file format includes that (*.doc) of MS-Word available from Microsoft Corporation, that (*.pdf) of Acrobat available from Adobe Systems Incorporated, and the like.

In step S3020, block selection (BS) processing is executed. This processing is executed under the control of the management PC 101.

More specifically, the CPU of the management PC 101 segments the raster image of the original document to be processed stored in the storage unit 111 into a text/line image region and a halftone image region. Next, the line image region is segmented into blocks that form clusters as paragraphs, or into tables or figures formed of lines.

On the other hand, the halftone image region is divided into blocks such as an image part separated into a rectangle, a background part, and the like.

Then, the page number of a page to be processed and block IDs used to specify blocks in that page are issued. These page numbers and block IDs are stored in the storage unit 111 as layout information and block information in association with the attributes (image, text, and the like), sizes, and positions (intra-page coordinates) in the original document of blocks. FIGS. 5 and 6 respectively show examples of the layout information and block information. These pieces of information will be described later.

In step S3030, the data processing unit 115 executes feature amount information extraction processing for extracting feature amount information of respective blocks in accordance with the types of blocks.

Especially, as for a text block, OCR processing is applied to extract character codes, which are to be used as a text feature amount. As for an image block, image feature amounts associated with luminance values and colors are extracted. At this time, feature amounts corresponding to respective blocks are combined in an original document unit, and are stored in the storage unit 111 as feature amount information in association with a document ID, page number, and block IDs.

[Overview of Search Processing]

An overview of search processing for searching electronic data of original documents will be described below using FIG. 3B.

Figure 3B:
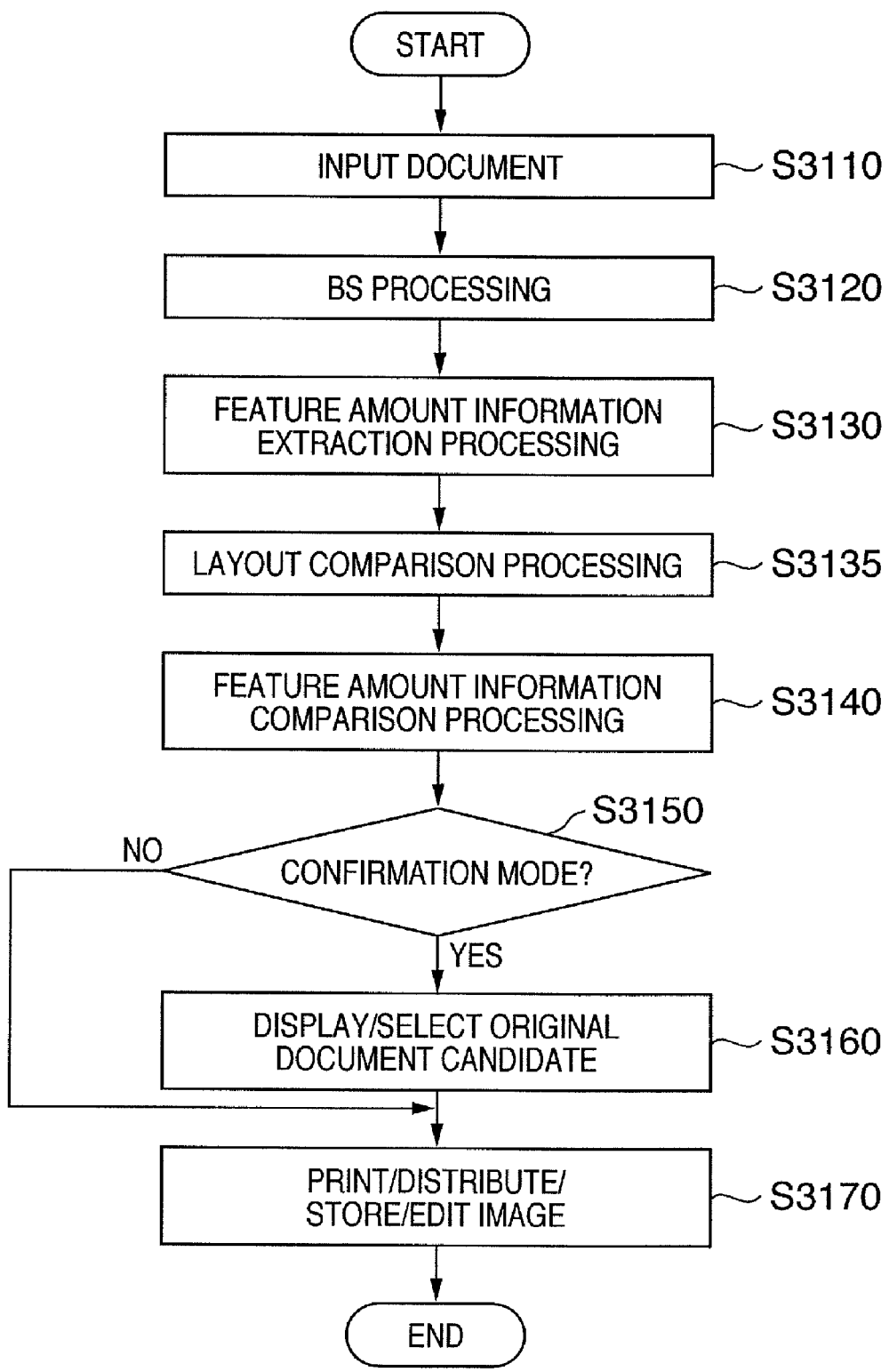
FIG. 3B is a flowchart showing search processing according to the embodiment of the present invention.

FIG. 3B is a flowchart showing the search processing according to the embodiment of the present invention.

In step S3110, a paper document serving as a search condition is input. This processing is the same as that in step S3010, and a description thereof will be omitted. However, a raster image generated by this processing is merely temporarily stored, and address information for the paper document need not be saved in the storage unit 111.

In step S3120, an image region in the raster image undergoes block selection (BS) processing.

Note that the block selection processing itself is the same as that in step S3020, and a description thereof will be omitted. However, the attributes, sizes, and positions of respective blocks generated by this block selection processing are merely temporarily saved, and block information for the paper document need not be saved in the storage unit 111.

In step S3130, feature amount information extraction processing for extracting feature amount information of respective blocks is executed. This processing is the same as that in step S3030, and a description thereof will be omitted. However, feature amounts of respective blocks generated by this processing are merely temporarily saved, and feature amount information for the paper document need not be saved in the storage unit 111.

In step S3135, layout comparison processing based on the corresponding layout information and block information is executed between the image (comparison source image) in the input paper document and electronic data (comparison destination images). From this layout comparison processing result, original document candidates to be presented as search results are narrowed down.

In step S3140, corresponding pieces of feature amount information are compared between the image (comparison source image) in the input paper document and electronic data (comparison destination images) to calculate their similarity levels, and original document candidates to be presented as search results are determined. The electronic data are stored in any of the hard disk in the client PC 102, the database 105 in the document management server 106 in the office 10 or 20, and the storage unit 111 of the MFP 100.

It is checked in step S3150 if a user confirmation mode is selected.

Note that the user confirmation mode allows the user to confirm whether or not a desired original document that he or she wants is retrieved among original document candidates obtained by the comparison processing. More specifically, a user interface including an original document candidate group is implemented by the display unit 116 and input unit 113. In this mode, the user can confirm the contents of the original document candidate group using this user interface. Details of the configuration of this user interface will be described later.

If it is determined in step S3150 that the user confirmation mode is not selected (NO in step S3150), a document which is determined by the comparison processing to have a highest similarity level is automatically selected, and the flow jumps to step S3170. On the other hand, if the user confirmation mode is selected (YES in step S3150), the flow advances to step S3160 to display/select original document candidates. Especially, this selection is implemented by displaying thumbnail images of original document candidates on the display unit 116 and prompting the user to select a thumbnail image of a desired original document candidate from a plurality of original document candidates.

In step S3170, one of processing operations, i.e., printing, distribution, storage, and editing is executed for the selected original document based on an operation of the user via the user interface implemented by the display unit 116 and the input unit 113.

As described above, a document to be processed undergoes the block selection processing, feature amount extraction processing, and layout comparison processing, and similar image search processing is executed in turn for respective pages using these processing results. In this way, electronic data corresponding to that document can be retrieved and utilized.

[Details of Respective Kinds of Processing]

Details of respective kinds of processing will be described below.

Details of the block selection processing in step S3020 and step S3120 will be described first.

Figure 9B:
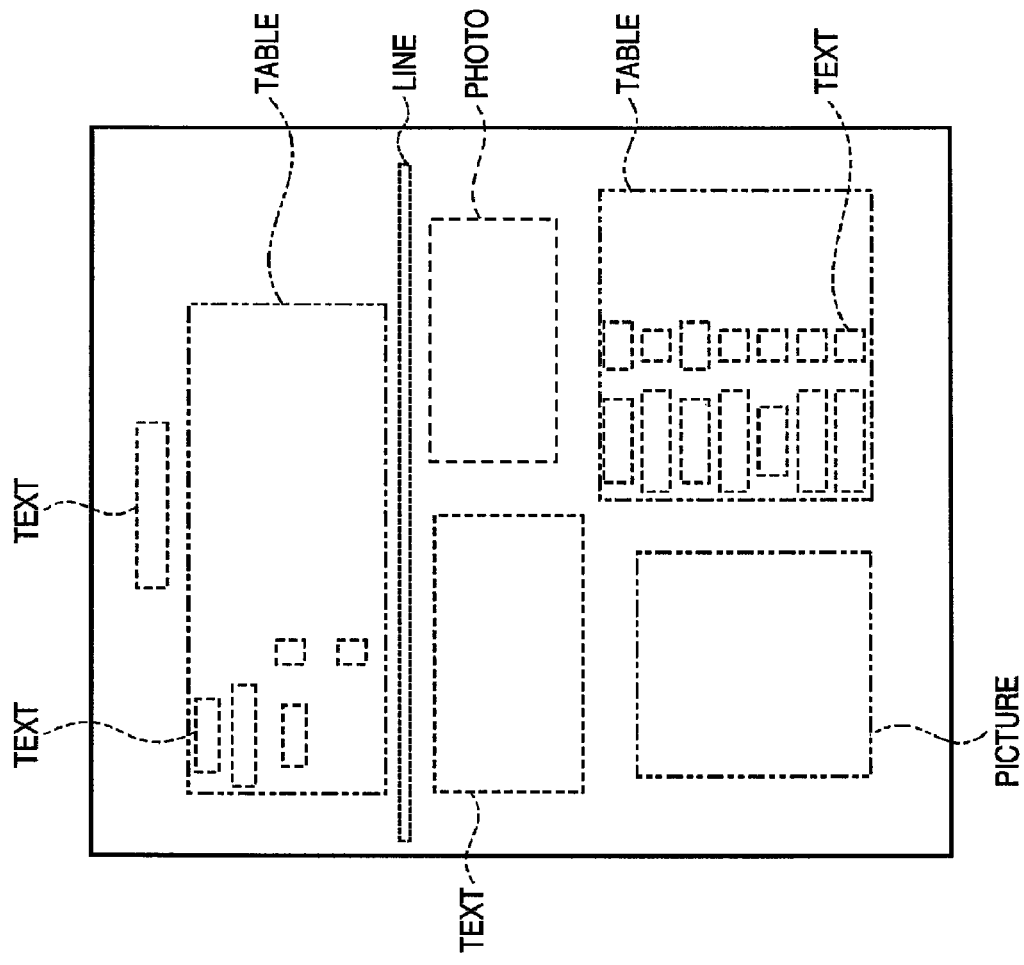
FIGS. 9A and 9B are views for explaining an example of image block extraction according to the embodiment of the present invention.
Figure 9A:
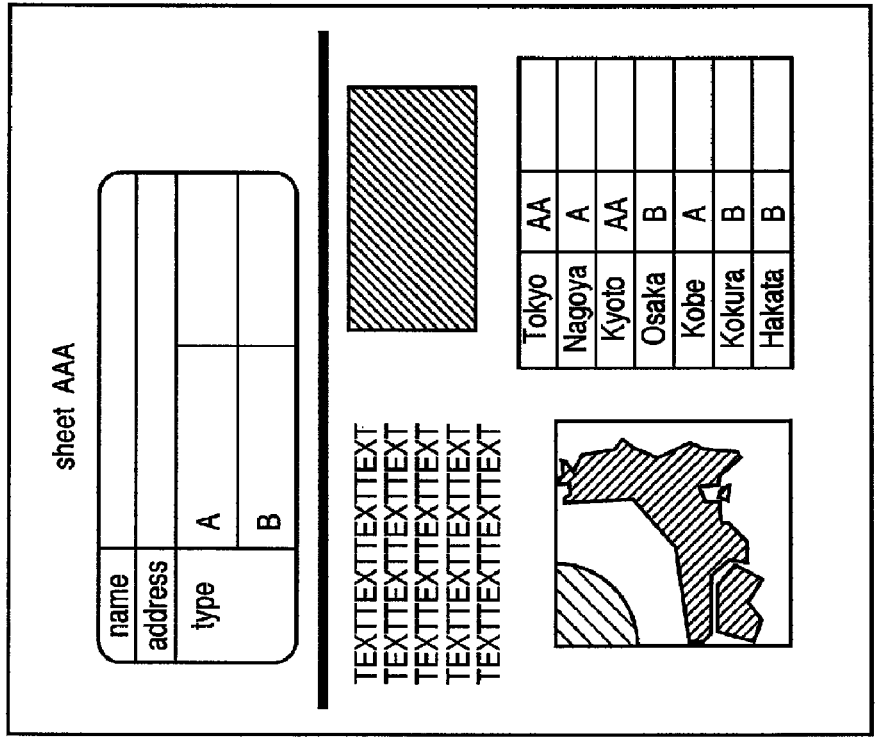

In the block selection processing, for example, a raster image shown in FIG. 9A is recognized as clusters for respective significant blocks, as shown in FIG. 9B, attributes (text (TEXT)/picture (PICTURE)/photo (PHOTO)/line (LINE)/table (TABLE), etc.) of respective blocks are determined, and the raster image is segmented into blocks having different attributes.

An embodiment of the block selection processing will be described below.

An input image is binarized to a monochrome image, and a cluster of pixels bounded by black pixels is extracted by contour tracing. For a cluster of black pixels with a large area, contour tracing is made for white pixels in the cluster to extract clusters of white pixels. Furthermore, a cluster of black pixels is recursively extracted from the cluster of white pixels with a predetermined area or more.

The obtained clusters of black pixels are classified into regions having different attributes in accordance with their sizes and shapes. For example, a pixel cluster which has an aspect ratio close to 1, and has a size that falls within a predetermined range is determined as that corresponding to a character. Furthermore, a part where neighboring characters regularly line up and can be grouped is determined as a text block. Also, a low-profile pixel cluster is categorized as a line block, a range occupied by black pixel clusters that include rectangular white pixel clusters which regularly line up is categorized as a table block, a region where pixel clusters with indeterminate forms are distributed is categorized as a photo block, and other pixel clusters with an arbitrary shape is categorized as a picture block.

Then, information indicating the intra-page configuration of the text regions (text blocks) and image regions (photo block, picture block, and the like) segmented by the block selection processing is stored as layout information. As for the layout information, there are a plurality of description formats depending on the coordinate systems that represent positions, the organization methods of data, and the like.

A desired description format is closely related to the layout comparison processing in step S3135 in FIG. 3B. The gist of the layout processing of this embodiment will be described first.

Figure 7:
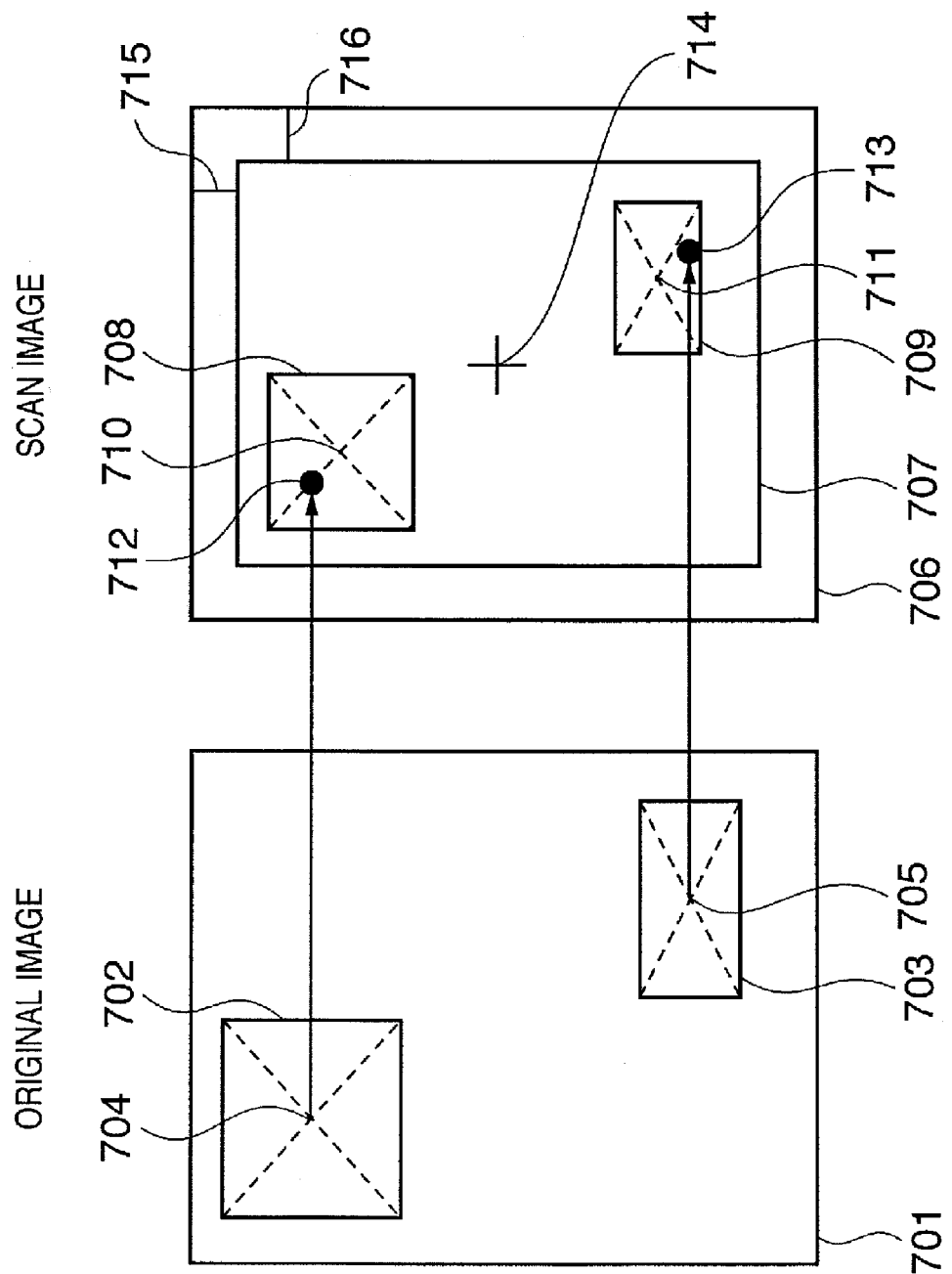
FIG. 7 is a view for explaining the problems in the prior art.

As has been described in the paragraphs of "BACKGROUND OF THE INVENTION" using FIG. 7, in case of a scan image of printed material including blank spaces due to the print margins and the like, blocks (image or text regions) in a document deviate in the center of gravity direction with respect to its original image.

By contrast, since the positional relationship among the blocks remains the same, no deviations occur in directions other than the center of gravity direction (especially, in a direction perpendicular to the center of gravity direction). By utilizing this fact, upon comparison of the layouts of blocks, layout comparison need only be executed under a loose condition for only the positional deviations in the center of gravity direction.

Since the blocks are reduced in proportion to the positional deviation amounts, comparison with higher precision can be conducted using this condition.

In consideration of the above points, this embodiment expresses the positions of blocks in a document, as shown in FIG. 8.

A coordinate system shown in FIG. 8 is a polar coordinate system. Reference numeral 801 denotes a document region; and 802 and 803, blocks. The blocks 802 and 803 respectively have center of gravities 804 and 805. The positions of the blocks 802 and 803 are respectively expressed by angles 806 and 807 and distances 809 and 810 of lines that connect the center of gravities 804 and 805, and an origin (center of gravity of the document region 801) 811.

On this coordinate system, the layout comparison is executed under the loose condition with respect to only positional deviations of the document region 801 in the center of gravity direction as follows.

As for a condition which is free from any deviations in directions other than the center of gravity direction, if the angles (block angles) of the center of gravities of blocks in the comparison source image and comparison destination image are the same, the center of gravities of the two blocks are located on an identical line from the origin (the center of gravity of the document region). For this reason, in such case, this condition is satisfied.

On the other hand, the loose condition for deviations in the center of gravity direction of the document region can be satisfied when the difference between the distances (to be referred to as block distances hereinafter) of all blocks included in the comparison source image and comparison destination image from the origin falls within a predetermined value range.

Normally, since a document includes a plurality of blocks, the loose condition for deviations of blocks in the document region in the center of gravity direction may be as follows.

That is, if a relative value, i.e., a ratio between the block distances (to be referred to as a block distance ratio hereinafter) is used, since such value does not depend on the absolute value while maintaining the positional relationship, the condition used to see if the difference between the distances falls within the predetermined value range is not required.

For example, when a comparison source image includes two blocks and their block distances are respectively 50 and 100, and when the block distances of two blocks in a comparison destination image are respectively 60 and 120, the block distance ratios of both the images are 1:2. In such case, the blocks in the comparison source image and comparison destination image are handled to be similar to each other. However, since the order of calculating the block distance ratio must not be different in the comparison source image and comparison destination image, a rule is set so that blocks are selected counterclockwise in turn from a block closest to a reference line.

In a special case wherein a document includes only one block, the block distance ratio cannot be calculated. The distances themselves from the origin are compared, and it is determined if the difference falls within the predetermined value range. Based on that determination result, it is determined if the two images are similar to each other.

When the center of gravity of a block matches the origin, any positional deviation of that block is impossible, and such block is excluded.

By utilizing the above fact, upon registering documents, various kinds of information about the number of image or text regions in a document, block angles, and block distance ratio are stored together in the storage unit 111 as layout information for respective documents in which these kinds of information are matched. Upon comparison, only documents in each of which the number of image or text regions in documents, block angles, and block distance ratio match those in the comparison source image are read out with reference to the layout information. Since the readout documents can be used as those to be compared, the use efficiency of the storage unit 111 and the comparison speed can be improved.

Details of the layout information shown in FIG. 5 will be described below.

In the layout information shown in FIG. 5, the number of image or text regions (blocks), block angles, and block distance ratio are managed together for respective documents in which these kinds of information are matched. For this reason, these kinds of information are used as keys upon comparison. That is, the number of blocks included per document (page), the block angles of respective blocks, and the block distance ratio are used as keys, and document IDs and page numbers of documents in which all these kinds of information are matched are described together (document ID, page number).

In an exceptional case wherein a document includes only one block, since the block distance ratio cannot be described, the block distance itself is described. When the center of gravity of a block matches the origin, since both the block angle and block distance ratio do not exist, the aspect ratio and size, and type are used as clues to such special block. In such case, both the block angle and block distance ratio are described as zero, and only blocks corresponding to these values are given a special treatment. Note that details of such treatment will be described later.

Details of the block information shown in FIG. 6 will be described below.

In the block information shown in FIG. 6, a document ID is assigned to classify each document. A page number indicates the number of a page in a document. A block ID is used to classify each block and is assigned for each page. A block unit distance is a real size when the block distance ratio is 1. An aspect ratio is that of a block (or a circumscribing rectangle of a region when that region has an arbitrary shape). A size is that of a block. However, since the aspect ratio is known, the size need not be an area, and a length in the fixed direction, i.e., either the length or width need only be described. A type is that of an attribute such as text/picture/photo/line/table, or the like. A feature amount stores that (text feature amount (e.g., character codes), image feature amount (e.g., colors)) according to the type. Note that details will be described later.

Details of the feature amount information extraction processing in step S3030 and step S3130 will be described below.

Since the feature amount information extraction processing requires different processing methods for an image block and text block, these methods will be separately described.

Note that the image block includes a photo block and picture block in the example of FIG. 9B. However, at least one of the photo block and picture block can be used as the image block depending on use applications or purposes.

The feature amount information extraction processing for an image block will be described first.

If one document includes a plurality of image blocks, the following processing is repeated in correspondence with the total number of image blocks.

In this embodiment, color feature amount information extraction processing for extracting a color feature amount associated with colors of an image is executed as an example.

Details of this color feature amount information extraction processing will be described below using FIG. 10.

FIG. 10 is a flowchart showing details of the color feature amount information extraction processing according to the embodiment of the present invention.

Note that this processing extracts, as color feature information, information which associates a color showing a highest frequency of occurrence in a color histogram of each mesh block obtained by segmenting an image into a plurality of mesh blocks with the position information of that mesh block.

Figure 11:
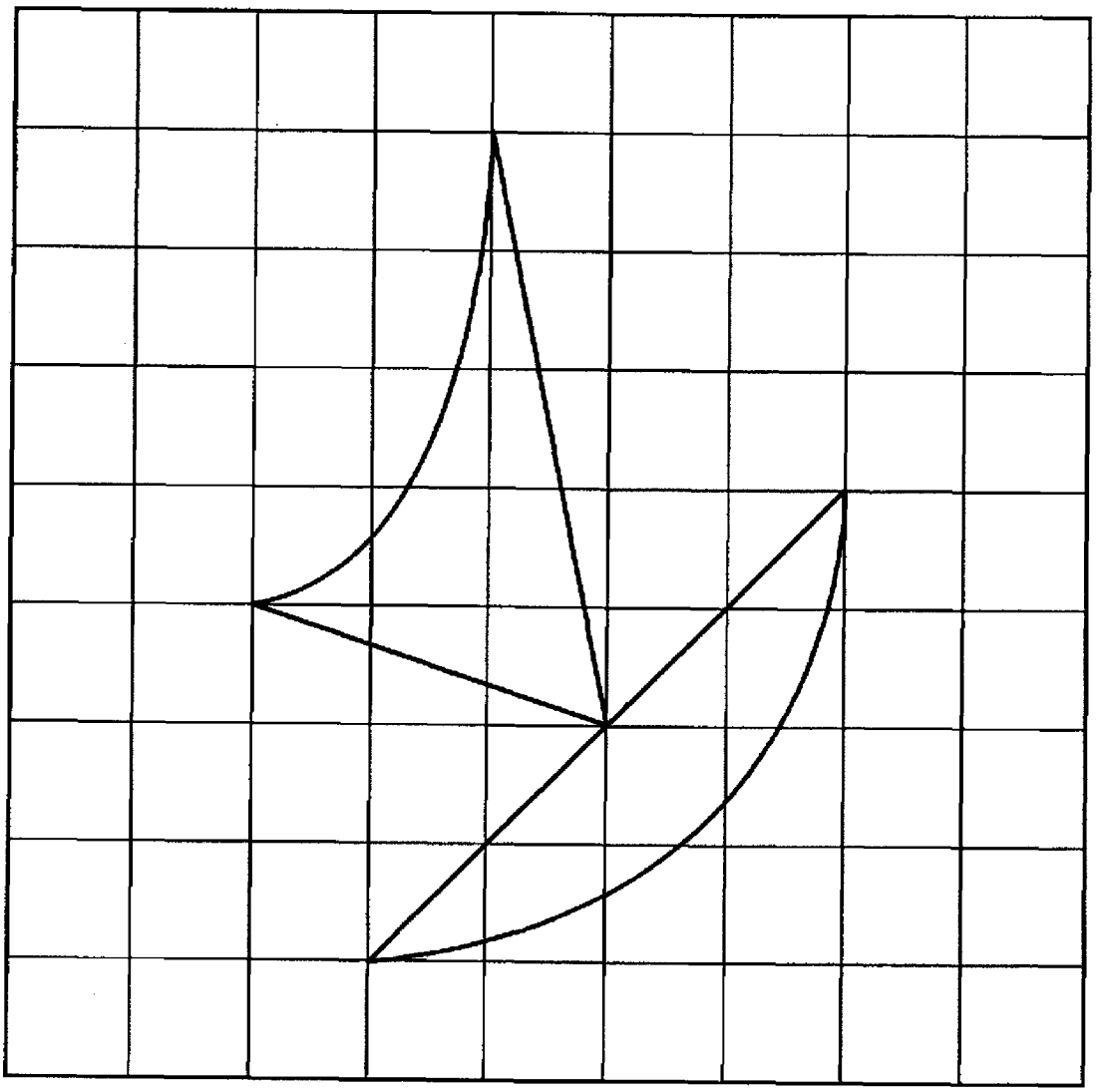
FIG. 11 is a view showing an example of image mesh block segmentation according to the embodiment of the present invention.

In step S1020, an image is segmented into a plurality of mesh blocks. In this embodiment, as shown in FIG. 11, an image is segmented into 9 (vertical)×9 (horizontal) mesh blocks. Especially, this embodiment exemplifies a case wherein the image is segmented into 9×9=81 mesh blocks for the sake of descriptive convenience. However, in practice, the image is preferably segmented into 15×15=225 mesh blocks.

Figure 12:
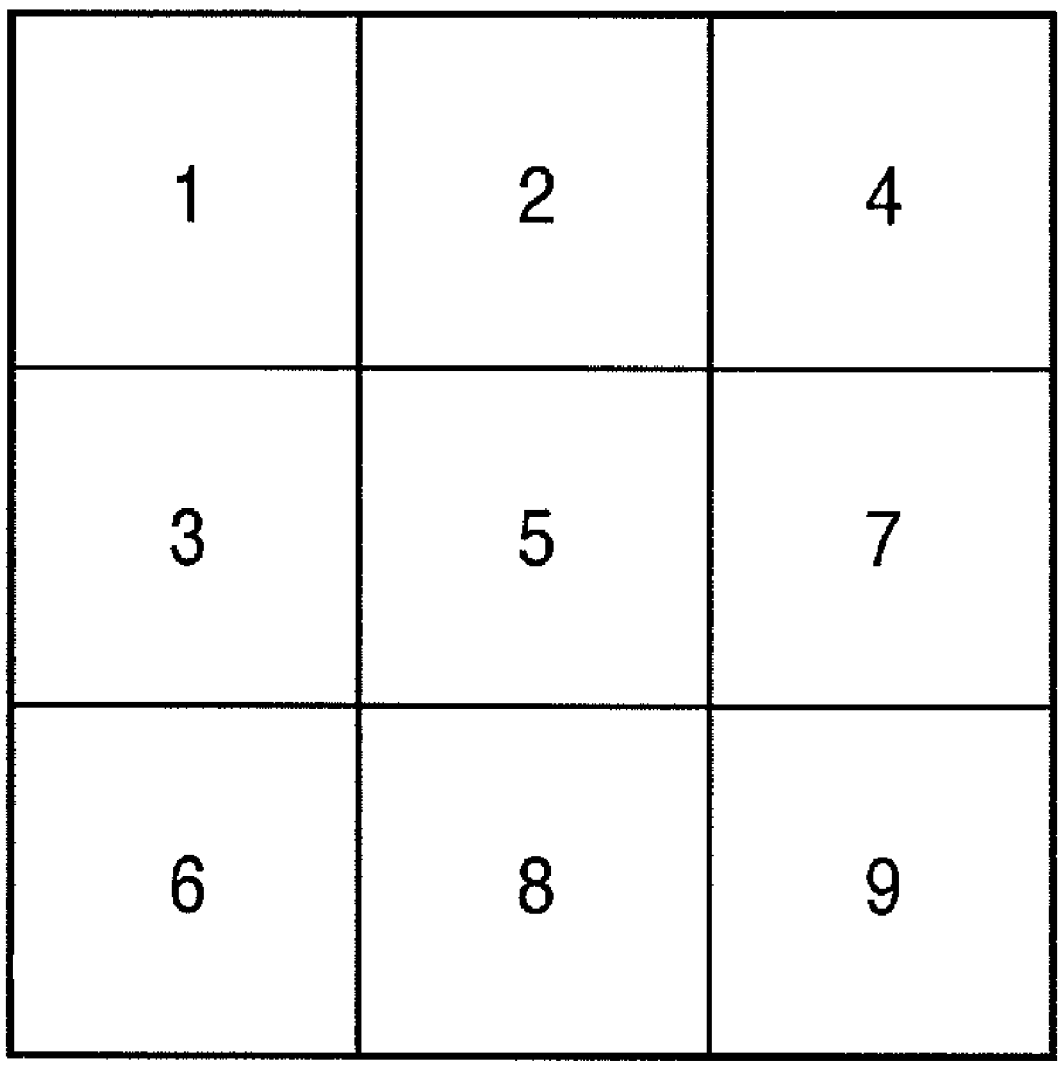
FIG. 12 shows an example of an order determination table according to the embodiment of the present invention.

In step S1030, a mesh block at the upper left end is set as a mesh block of interest to be processed. Note that the mesh block of interest is set with reference to an order determination table which determines the processing order in advance, as shown in, e.g., FIG. 12 (note that FIG. 12 shows an example of 3×3).

It is checked in step S1040 if a mesh block of interest to be processed still remains. If no mesh block of interest to be processed remains (NO in step S1040), the processing ends. If a mesh block of interest to be processed still remains (YES in step S1040), the flow advances to step S1050.

Figure 13:
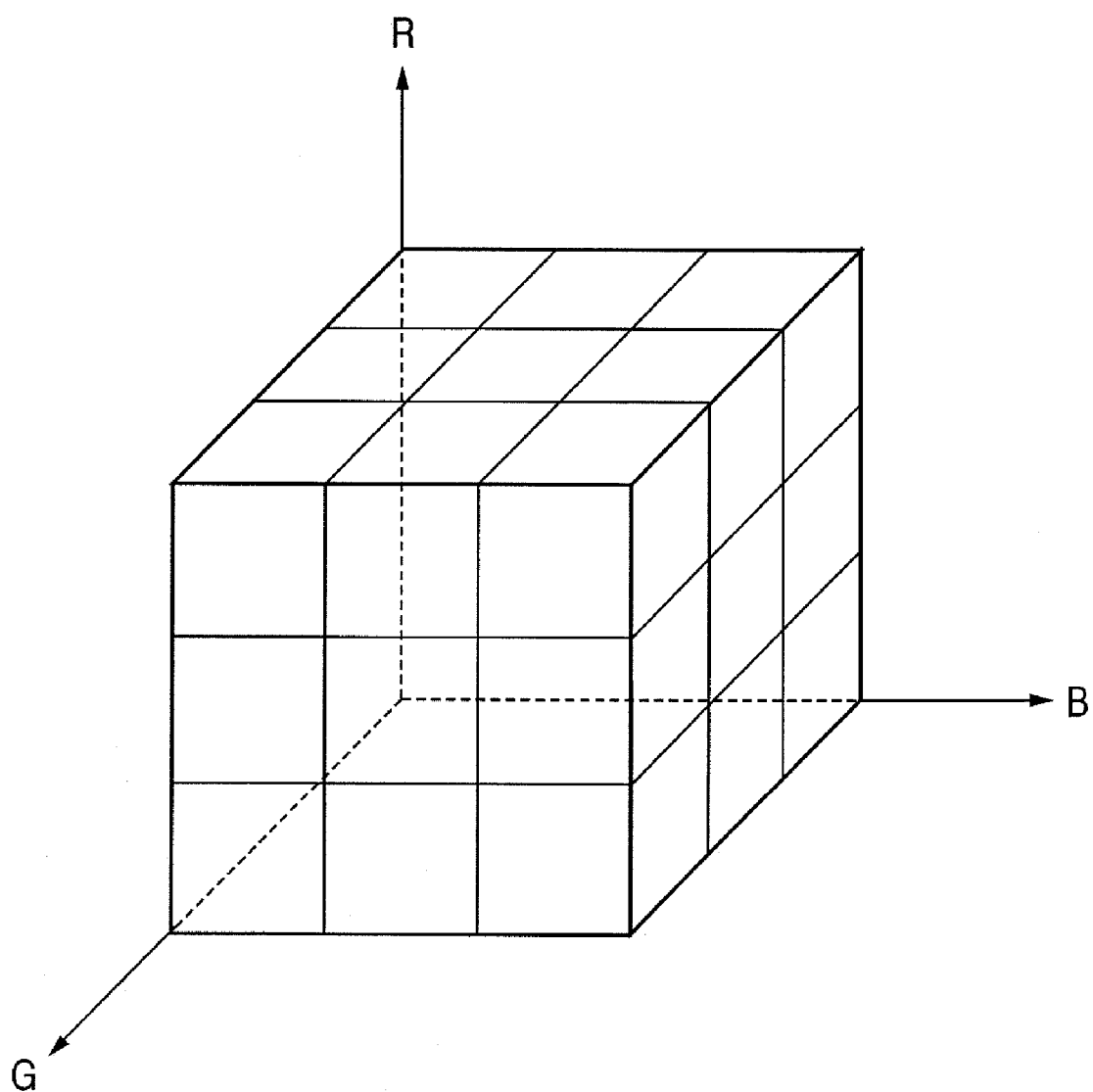
FIG. 13 shows an example of the configuration of color bins on a color space according to the embodiment of the present invention.

In step S1050, the respective density values of all pixels of the mesh block of interest are projected onto color bins as a partial space formed by dividing a color space shown in FIG. 13, thus generating a color histogram for the color bins.

Note that this embodiment exemplifies a case wherein the density values of all the pixels of the mesh block of interest are projected onto color bins formed by dividing the RGB color space into 3×3×3=27, as shown in FIG. 13. However, the present invention is not limited to such specific case. In practice, the density values of all the pixels of the mesh block of interest are preferably projected onto color bins formed by dividing the RGB color space into 6×6×6=216.

In step S1060, the color bin ID of the highest-frequency color bin of the color histogram is determined as a representative color of the mesh block of interest, and is stored in the storage unit 111 in association with the mesh block of interest and its position.

In step S1070, the mesh block of interest as the next mesh block to be processed is set with reference to the order determination table shown in FIG. 12. After that, the flow returns to step S1040 to recursively repeat the processes in steps S1040 to S1070 until it is determined that no mesh block of interest to be processed remains.

With the above processing, the information which associates the representative color information with the position information for each mesh block of the image to be processed (image block) can be extracted as color feature amount information.

Next, the feature amount extraction processing for a text block will be described below.

When one document includes a plurality of text blocks, the following processing is repeated in correspondence with the total number of text blocks.

Assume that text feature amount information for a text block includes character codes obtained by applying OCR (character recognition) processing to that text block.

The OCR (character recognition) processing performs character recognition for a character image extracted from a text block for respective characters using a given pattern matching method, and acquires a corresponding character code.

In this character recognition processing, an observation feature vector obtained by converting a feature acquired from a character image into a several-ten-dimensional numerical value string is compared with dictionary feature vectors obtained in advance for respective character types, and a character type with a shortest distance is output as a recognition result.

Various known methods are available for feature vector extraction. For example, a method of dividing a character into a mesh pattern, and counting character lines in respective mesh blocks as line elements depending on their directions to obtain a (mesh count)-dimensional vector as a feature is known.

When a text block extracted by the block selection processing (step S3020 or S3120) undergoes character recognition, the writing direction (horizontal or vertical) is determined for that text block, a character string is extracted in the determined direction, and characters are then extracted from the character string to acquire character images.

Upon determining the writing direction (horizontal or vertical), horizontal and vertical projections of pixel values in the text block are calculated, and if the variance of the horizontal projection is larger than that of the vertical projection, that text block can be determined as a horizontal writing block; otherwise, that block can be determined as a vertical writing block. Upon decomposition into character strings and characters, in case of a horizontal writing text block, lines are extracted using the horizontal projection, and characters are extracted based on the vertical projection for the extracted line. On the other hand, in case of a vertical writing text block, the relationship between the horizontal and vertical parameters may be exchanged.

Details of the layout comparison processing in step S3135 will be described below.

Figure 14:
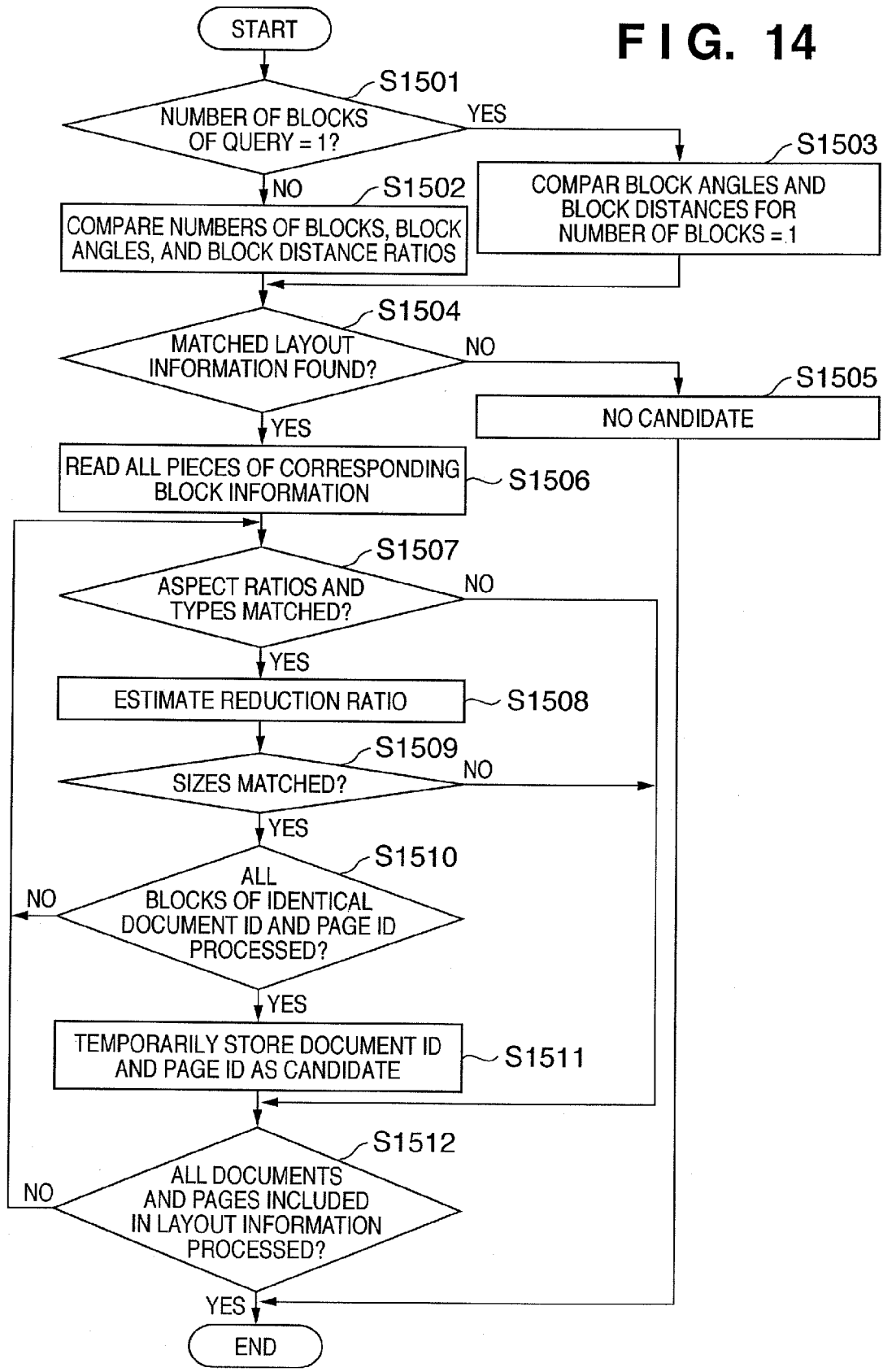
FIG. 14 is a flowchart showing details of layout comparison processing according to the embodiment of the present invention.

FIG. 14 is a flowchart showing details of the layout comparison processing according to the embodiment of the present invention.

Note that this layout comparison processing roughly includes the processes in the following two stages. It is determined if the layouts of blocks on a document are matched. After that, it is determined if individual blocks have the same attributes (aspect ratio, size, type, etc.).

It is determined in steps S1501 to S1504 if the layouts of blocks on a document are matched.

It is determined first in step S1501 if the number of blocks of a scan image used as a query is 1. If the number of blocks is 2 or more (NO in step S1501), the flow advances to step S1502 to compare the number of blocks, block angles, and block distance ratio of the query with those in layout information in a layout information group.

Note that all pieces of layout information are loaded onto the storage unit 111 at the beginning of search. As described above, when the numbers of blocks, block angles, and the block distance ratios are compared using this layout information, comparison that permits only positional deviations in the center of gravity direction of blocks can be made.

On the other hand, if it is determined in step S1501 that the number of blocks is 1 (YES in step S1501), the flow advances to step S1503 to compare the block angle and block distance with those of layout information which has the number of blocks=1 in the layout information group.

As described above, when the number of blocks in a document is 1, the block distance ratio cannot be calculated. For this reason, in such case, the block distance ratio describes the block distance, and direct comparison is made using the block distances. In order to allow deviations in the center of gravity direction, if their differences falls within a predetermined threshold range, it is determined that the two distances match.

It is determined in step S1504 if matched layout information is found. If matched layout information is found (YES in step S1504), since it has the same block layout as that of the query, it is checked in steps S1506 to S1512 if attributes of blocks match. On the other hand, if it is determined in step S1504 that no matched layout information is found (NO in step S1504), the flow advances to step S1505 to output a message indicating no candidate, thus ending this processing.

In step S1506, all pieces of block information are read out from the storage unit 111 onto the memory with reference to the document ID and page number group of the layout information that matches the query. It is determined in step S1507 if the aspect ratios and types match. If the aspect ratios and types do not match (NO in step S1507), the flow jumps to step S1512 while skipping processes in steps S1508 to S1511.

On the other hand, if the aspect ratios and types match (YES in step S1507), the flow advances to step S1508 to execute estimation of a reduction ratio. In this processing, the block unit distance in the block information is referred to and is compared with that of the query, and a reduction ratio is estimated based on their difference. If a document is reduced, the block distance becomes small; if a document is enlarged, it becomes large. This degree is proportional to the difference from the block distance of the query. Thus, the relationship between the block distance differences and the reduction ratios is statistically calculated, and the reduction ratio can be estimated from the difference from the obtained block distance.

It is determined in step S1509 in consideration of the reduction ratio calculated in step S1508 if the sizes match. If the sizes do not match (NO in step S1509), the processes in steps S1510 and S1511 are skipped, and the flow Jumps to step S1512.

However, if the sizes match (YES in step S1509), the flow advances to step S1510 to check if the processes in steps S1507 to S1509 have been executed for all blocks included in the identical document ID and page ID. If blocks to be processed still remain (NO in step S1510), the processes in steps S1507 to S1509 are repeated.

On the other hand, if the processes have been executed for all the blocks (YES in step S1510), the flow advances to step S1511. When the flow advances to step S1511, since it is determined that the aspect ratios, types, and sizes match for all the blocks, the document ID and page ID are temporarily stored in the memory as a candidate.

It is determined in step S1512 if the processes in steps S1507 to S1511 have been executed for blocks of all the loaded document IDs and page numbers. If documents/pages to be processed still remain (NO in step S1512), the processes in steps S1507 to S1511 are repeated. On the other hand, if the processes have been executed for all the documents/pages (YES in step S1512), the layout comparison processing ends.

If a block is located at the center of a document (if the center of gravity of the block matches the origin (the center of gravity of the document region)), the following exceptional processing is executed. In this case, since neither the block angle nor the block distance are available, as described above, such block is excluded from an object to be processed in comparison (steps S1501 to S1504) of the layouts of blocks on a document. In comparison of attributes of individual blocks, since the reduction ratio cannot be calculated, the size is determined based on only the aspect ratio and type (step S1507).

Details of the feature amount information comparison processing in step S3140 will be described below using FIG. 15.

Figure 15:
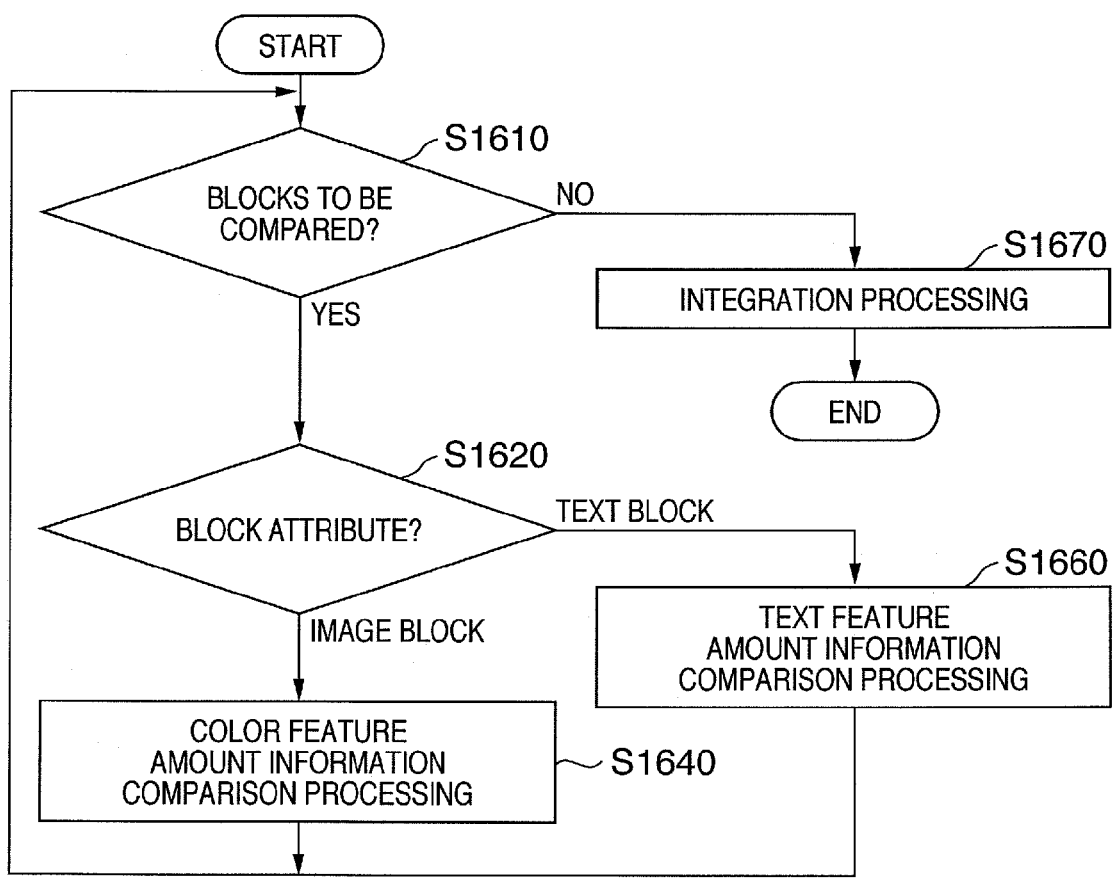
FIG. 15 is a flowchart showing details of feature amount information comparison processing according to the embodiment of the present invention.

FIG. 15 is a flowchart showing details of the feature amount information comparison processing according to the embodiment of the present invention.

Note that this feature amount information comparison processing is repeated for all the document IDs and page numbers of the search candidates narrowed down (retrieved) by the layout comparison processing (FIG. 14).

It is determined in step S1610 with reference to the block information if blocks to be compared still remain in electronic data corresponding to the document ID and page number to be processed. If no block to be compared remains (NO in step S1610), the flow advances to step S1670. On the other hand, if blocks to be compared still remain (YES in step S1610), the flow advances to step S1620.

In step S1620, the attribute of the query block is determined. If the attribute indicates an image block, the flow advances to step S1640. On the other hand, if the attribute indicates a text block, the flow advances to step S1660.

If the attribute indicates an image block, color feature amount information comparison processing as similarity comparison with a test block based on feature amount information associated with a color is executed in step S1640. Details of this processing will be described later. A similarity level obtained by this processing is temporarily stored in the storage unit 111 in correspondence with the document ID, page number, and block ID of the test block.

On the other hand, if the attribute indicates a text block, text feature amount information comparison processing as similarity comparison between a query block and test block based on text feature amount information is executed in step S1660. Details of this processing will be described later. A similarity level obtained by this processing is temporarily stored in the storage unit 111 in correspondence with the document ID, page number, and block ID of the test block.

If it is determined in step S1610 that comparison of all the blocks is complete (NO in step S1610), the flow advances to step S1670.

In step S1670, integration processing for calculating a similarity level between the paper document as the search condition and a page in the original document is executed. In this processing, the similarity levels of all the blocks included in the page of the test document (electronic data), which are stored in the storage unit ill by the processes in steps S1640 and S1660, are integrated. Details of this processing will be described later.

Details of the color feature amount information comparison processing in step S1640 will be described below using FIG. 16.

Figure 16:
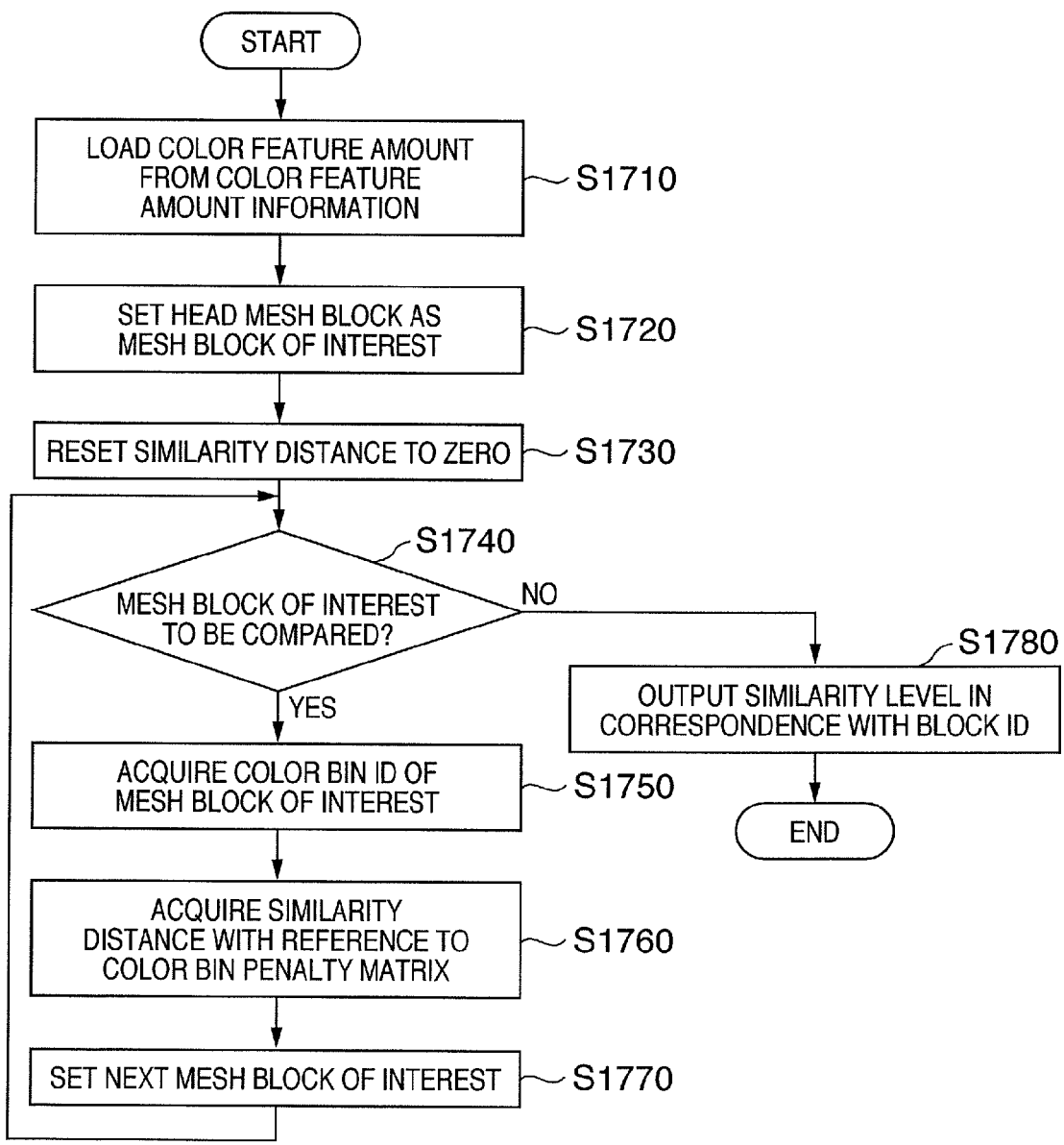
FIG. 16 is a flowchart showing details of color feature amount information comparison processing according to the embodiment of the present invention.

FIG. 16 is a flowchart showing details of the color feature amount information comparison processing according to the embodiment of the present invention.

In step S1710, the color feature amounts of a comparison source block and comparison destination image block are read out from the color feature amount information.

In step S1720, a head mesh block is set as a mesh block of interest to be processed. In step S1730, a similarity distance which indicates similarity between the color feature amounts of the comparison source image block and comparison destination image block is reset to zero.

It is determined in step S1740 if mesh blocks of interest to be compared still remain. If no mesh block of interest to be compared remains (NO in step S1740), the flow advances to step S1780. On the other hand, if mesh blocks of interest to be compared still remain (YES in step S1740), the flow advances to step S1750.

In step S1750, the color bin IDs of the mesh blocks of interest are acquired from the color feature amounts of the comparison source image block and comparison destination image block.

Figure 17:
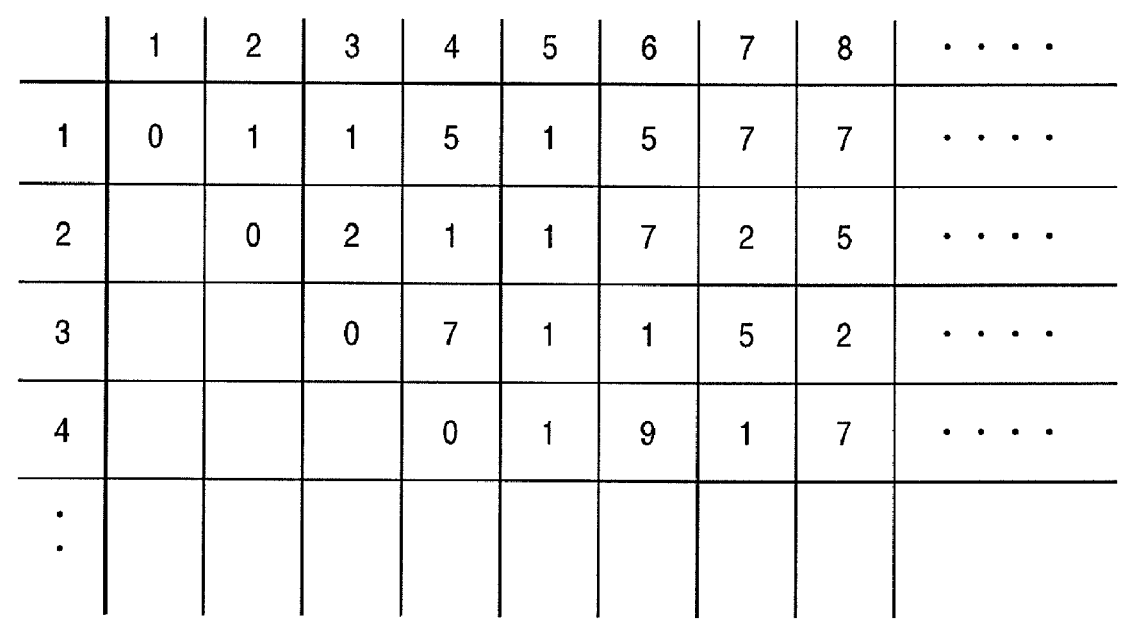

In step S1760, a local similarity distance between the mesh blocks of interest corresponding to the acquired color bin IDs is acquired with reference to a color bin penalty matrix shown in FIG. 17, and is cumulatively added to that acquired in the immediately proceeding processing. This similarity distance is stored in the storage unit 111.

The color bin penalty matrix will be described below using FIG. 17.

FIG. 17 shows the configuration of the color bin penalty matrix according to the embodiment of the present invention.

The color bin penalty matrix is a matrix used to manage the local similarity distances between color bin IDs. According to FIG. 17, in the color bin penalty matrix, identical color bin IDs have zero similarity distance, and the similarity distance becomes larger as the difference between the color bin IDs becomes larger, i.e., the similarity becomes lower. The diagonal positions between identical color bin IDs have zero similarity distance, and the matrix has symmetry to have the diagonal positions as a boundary.

In this embodiment, since the similarity distance between the color bin IDs can be acquired with reference to only the color bin penalty matrix, the processing can be speeded up.

In step S1770, the mesh block of interest as the next mesh block to be processed is set with reference to the order determination table shown in FIG. 12. After that, the flow returns to step S1740.

If it is determined in step S1740 that no mesh block of interest to be compared remains (NO in step S1740), the flow advances to step S1780. In step S1780, the similarity distance stored in the storage unit 111 is converted into a similarity level, which is output together with the block ID of the reference source block.

Upon conversion to the similarity level, for example, a similarity level=100% is defined when the similarity distance assumes a minimum value, a similarity level=0% is defined when the similarity distance assumes a maximum value, and a similarity level corresponding to the similarity distance within this range can be calculated on the basis of a difference from the minimum or maximum value.

Details of the text feature amount information comparison processing in step S1660 will be described below.

In this processing, character codes in the text blocks of the comparison source image and comparison destination image are compared, and a similarity level is calculated based on their degree of matching.

If a paper document as the search condition is to be compared with an original document, it is ideal that the similarity level becomes 100%. However, in practice, since the OCR processing applied to a text block in the paper document as the search condition may cause recognition errors, the similarity level does not often reach 100% in case of comparison with the original document, but it assumes a value proximate to 100%.

Details of the integration processing in step S1670 will be described below.

In this integration processing, similarity levels for respective blocks are integrated so that the similarity level of a block which occupies a larger area in the original image as the comparison destination image is reflected largely as that of the entire original image.

For example, assume that similarity ratios n1 to n6 are respectively calculated for blocks B1 to B6 in the reference destination image. At this time, an integrated similarity ratio N of the entire original document is given by:

$$N = w1*n1 + w2*n2 + w3*n3 + \ldots + w6*n6 \quad (1)$$

where w1 to w6 are weighting coefficients that evaluate the similarity ratios of the respective blocks. The weighting coefficients w1 to w6 are calculated based on the occupation ratio of each block in the original document. For example, let S1 to S6 be the sizes of the blocks B1 to B6. Then, the occupation ratio w1 can be calculated by:

$$w1 = S1/(S1 + S2 + \ldots + S6) \quad (2)$$

By the weighting processing using such occupation ratio, the similarity level of a block which occupies a larger area in the original document can be largely reflected on that of the entire original document.

Details of the processing in the confirmation mode in steps S3150 and S3160 will be described below.

The confirmation mode may be designated in advance by the user or whether or not the confirmation mode is to be set may be automatically determined. The following automatic determination method is available. For example, if only one original document candidate is retrieved, "non-confirmation mode" is set, and the flow advances to step S3170. On the other hand, if the difference between the similarity levels of the original document candidates of the first and second places is equal to or larger than a predetermined value, and the original document candidate of the first place is more likely to be a desired original document, "non-confirmation mode" is set, and the flow advances to step S3170. Otherwise, "confirmation mode" is set.

In case of "confirmation mode", original document candidates are displayed on the user interface implemented by the display unit 116 and the input unit 113 in descending order of similarity level, and the user selects a desired original document from them.

In this manner, when execution/non-execution of the confirmation mode is automatically determined, since the need for the selection operation of an original document by the user can be obviated, the number of operation steps can be reduced.

An example of the user interface in the confirmation mode will be described below using FIG. 18.

Figure 18:
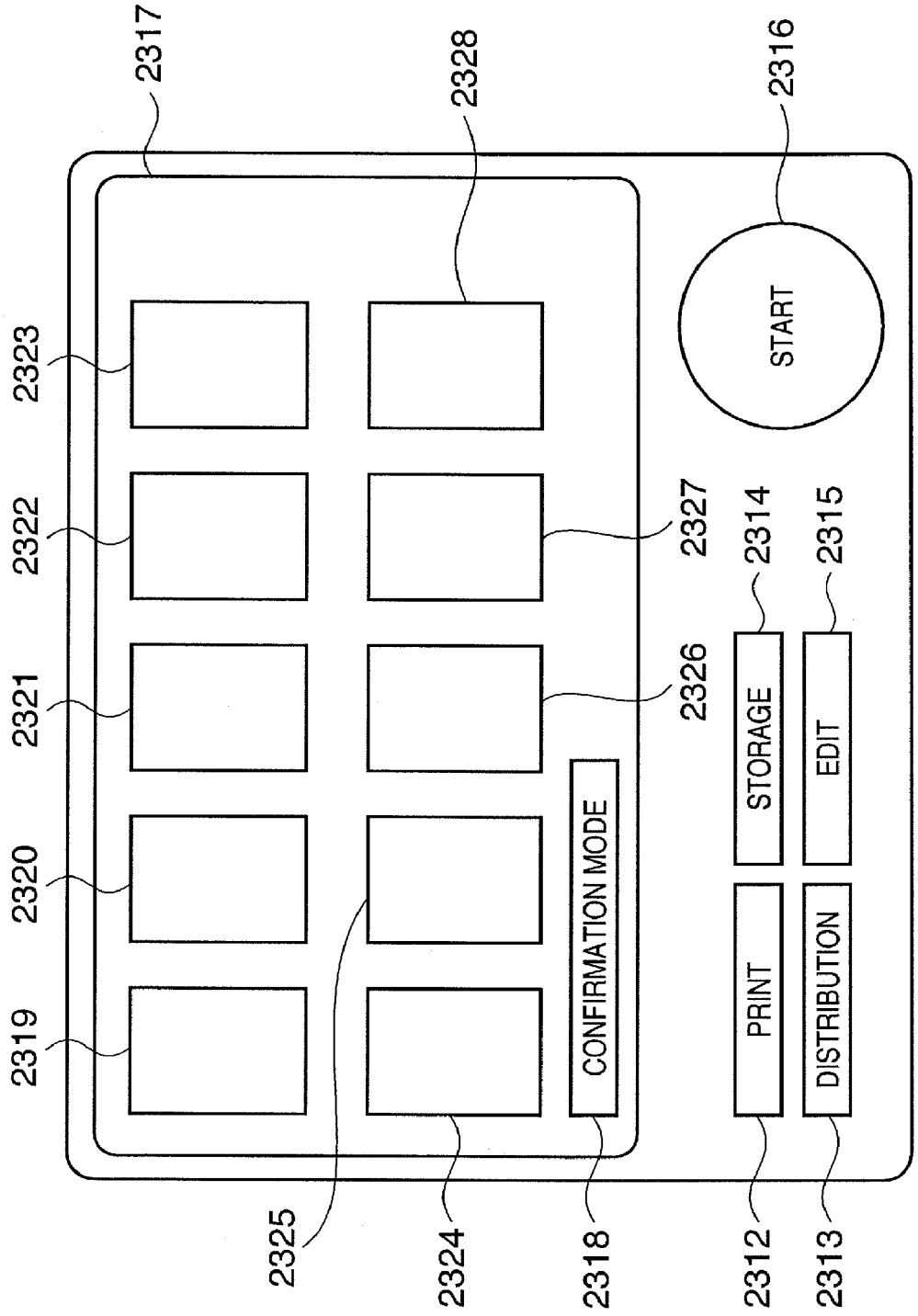
FIG. 18 shows an example of a user according to the embodiment of the present invention.

FIG. 18 shows an example of the user interface according to the embodiment of the present invention.

Reference numeral 2311 denotes a display/operation panel. Reference numerals 2312 to 2315 denote various function buttons. These function buttons 2312 to 2315 are used to issue a print instruction, distribution instruction, storage instruction, and edit instruction of an image to be processed.

Reference numeral 2316 denotes a start button. When this start button 2316 is pressed, the function selected by the function button can be executed.

Reference numeral 2317 denotes a display area, which comprises a touch panel. When the user directly touches the screen of the display area 2317, he or she can issue a selection instruction. Reference numeral 2318 denotes a mode display area, which indicates the confirmation mode in FIG. 18. Normally, an automatically determined mode is displayed. By touching this area, the user can cyclically designate "confirmation mode" and "non-confirmation mode".

Reference numerals 2319 to 2328 denote thumbnail images of original document candidates to be output as search results. These thumbnail images are displayed in the number order from 2319 and in descending order of similarity level.

In this example, a maximum of 10 thumbnail images are displayed. If more than 10 original document candidates are retrieved, top 10 thumbnail images are displayed. By selecting a desired thumbnail image from these thumbnail images 2319 to 2328, a desired original document can be selected, and various kinds of processing for the selected original document can be executed.

As described above, according to this embodiment, layout comparison between a scan image and original image is executed in consideration of blank space regions and positional deviations of image or text regions which occur between the scan image and original image. As a result, based on a scan image which includes blank spaces due to print margins and the like, corresponding original electronic data can be retrieved with high precision.

OTHER EMBODIMENTS

As described above, the gist of the layout comparison processing of the present invention is that comparison is made under a loose condition only for positional deviations in the center of gravity direction upon comparing the layouts of blocks. The present invention is not limited to the layout comparison method described in the above embodiment as long as methods are compliant to this gist. For example, the following method may be used.

A method of implementing layout comparison processing by determining the degree of overlapping between blocks based on an area in blocks in a comparison destination image (e.g., an original image) and a comparison source image (e.g., a scan image) will be described below.

Figure 19:
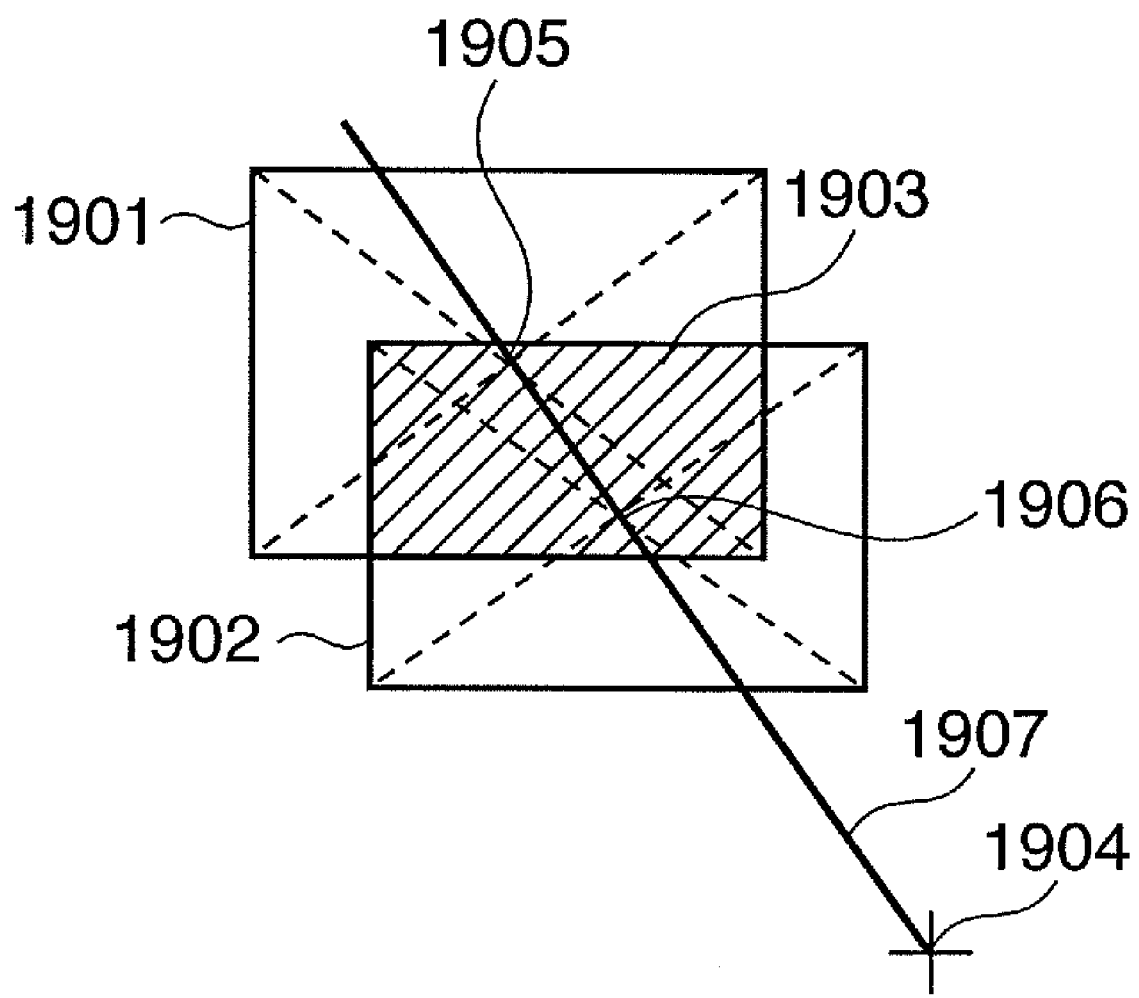
FIG. 19 is a view for explaining another layout comparison method according to the embodiment of the present invention.

FIG. 19 is a view for explaining an overview of this processing.

Reference numeral 1901 denotes a block in an original image (electronic data; and 1902, a block in a query (scan image). FIG. 19 illustrates a case wherein the blocks 1901 and 1902 are superposed when the original image and scan images are superposed to fit each other. A hatched region 1903 indicates an overlapping region where the two blocks 1901 and 1902 overlap. If the area of this overlapping region 1903 100% matches those of the blocks 1901 and 1902, all of the positions, aspect ratios, and sizes of the blocks match.

When the scan image as the query includes blank spaces due to print margins and the like, as described above, the block 1902 in the scan image deviates from the block 1901 in the original image in the direction of the center of gravity (1904) of the document region. In addition, the block 1902 in the scan image has a smaller area since it is reduced compared to the block 1901 in the original image.

In order to take these facts into consideration, it is determined first if a center of gravity 1905 of the block 1901 in the original image, a center of gravity 1906 of the block 1902 in the scan image, and the center of gravity 1904 of the document region are located on an identical line. As a result of this determination, if these center of gravities are located on the identical line, the reduction ratio is estimated based on the distance between the center of gravities 1905 and 1906 as in the above embodiment. After the block 1901 is reduced based on this reduction ratio, it is moved to overlap the block 1902.

It is then determined if the area of the overlapping area 1903 100% matches those of the blocks 1901 and 1902. As a result of this determination, if these areas match, it is determined if the block types match. Whether or not the blocks completely match can be determined based on this determination result.

When the aforementioned processing is applied to all blocks in a document, it can be determined if layouts match. The merit of this method is to determine whether or not the aspect ratios and sizes of blocks match simultaneously with the block layouts.

In the aforementioned processing, if the coordinate system is expressed by a polar coordinate system as in the above embodiment as the coordinate system used to express the positions of blocks, whether or not the center of gravities are located on an identical line can be determined to see if their angles are the same, thus assuring the simplest implementation method. However, the coordinate system is not limited to such specific one. For example, any other coordinate systems such as an X-Y coordinate system which has an upper left point of an image as an origin, and the like may be used as long as they allow determination required for this method.

In this embodiment, the center of gravity of each block is expressed by the polar coordinate system, but it may be expressed by other coordinate systems. In this case, after the center of gravity expressed by the coordinate system used is converted into that expressed by the polar coordinate system, the layout comparison processing is executed.

In this embodiment, only positional deviations in the center of gravity direction are permitted, but the gist of the present invention is that wider positional deviations are permitted in the center of gravity direction than in directions other than the center of gravity direction. In other words, the gist of the present invention is that comparison is made while the position deviation amount upon deviating and comparing the positions of images in the center of gravity direction is set to be larger than those in other directions. Therefore, in order to cope with small positional deviations or the like upon printing, small positional deviations in directions other than the center of gravity direction may be permitted. For example, on the polar coordinate system of this embodiment, a small angle difference such as a block angle difference of less than 1° may be permitted.

The layout comparison processing of this embodiment is used as a pre-search for narrowing down search candidates used in the feature amount information comparison processing. This pre-search is required to quickly narrow down search candidates (comparison destination images in main search). Hence, if candidates can be sufficiently narrowed down, layout comparison may be partially used. For example, the processes up to determination of the layout of blocks on a document may be used as pre-search, and attribute comparison and feature amount comparison of blocks may be simultaneously done as main search.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-230088, filed Aug. 8, 2005, which is hereby incorporated by reference herein in its entirety.

What is claimed is:

1. An image processing apparatus for executing similarity comparison processing of images, comprising:
  storage means for storing a plurality of electronic data as comparison destination images;
  input means for electronically scanning printed material and inputting electronic data of the printed material as a comparison source image;

extraction means for extracting a plurality of partial regions from the comparison source image;

calculation means for calculating a distance between a center of one of the partial regions and a center of gravity of the source image as a first block distance and calculating a distance between a center of another partial regions and the center of gravity of the source image as a second block distance; and search means for searching said storage means for an image by using a distance ratio of the first block distance to the second block distance as a first search condition.

2. The apparatus according to claim 1, wherein said calculation means calculates a reduction ratio of a partial region of the comparison source image to a partial region of the comparison destination image based on a degree of positional deviation of the partial regions of the comparison source image and the comparison destination image, and said search means compares, as layout comparison, a size obtained when the partial region of the comparison destination image is reduced based on the reduction ratio with a size of the partial image of the comparison source image.

3. The apparatus according to claim 1, wherein said search means executes layout comparison using, when a center of gravity of an entire image is defined as an origin, a center of gravity angle, an angle a line that connects the origin and the center of gravity of a partial region makes with a reference line in the entire image and the origin.

4. The apparatus according to claim 1, wherein said search means executes layout comparison using, when a center of gravity of an entire image is defined as an origin, a center of gravity angle, an angle a line that connects the origin and the center of gravity of a partial region makes with a reference line, and a distance between a center of gravity of the partial region and the origin.

5. The apparatus according to claim 1, wherein said search means executes layout comparison using an area of an overlapping region where partial regions of the comparison source image and the comparison destination image overlap.

6. The apparatus according to claim 1, wherein said search means comprises:

determination means for determining whether or not center of gravities of partial regions of the comparison source image and the comparison destination image and a center of gravity of an image are located on an identical line; and calculation means for, when said determination means determines that the center of gravities are located on the identical line, calculating a reduction ratio of the partial region of the comparison source image to the partial region of the comparison destination image based on a degree of positional deviation between the center of gravities of the partial regions of the comparison source image and the comparison destination image, and said search means executes layout comparison between a partial image obtained by reducing the partial region of the comparison destination image based on the reduction ratio, and the partial region of the comparison source image.

7. The apparatus according to claim 1, said search means comprising:

layout comparison means for executing layout comparison between the distance ratio of the comparison source images and a distance ratio of the comparison destination images;

first search means for searching said storage means for images corresponding to the first search condition based on a result of said layout comparison means;

feature amount comparison means for executing feature amount comparison between partial regions of the comparison source image and partial regions of the respective images corresponding to the first search condition searched by said first search means; and second search means for searching the images searched by said first search means for an image corresponding to the feature amount of the comparison source image based on a result of said feature amount comparison means.

8. A method of controlling an image processing apparatus executed by a CPU, comprising:

an input step of electronically scanning printed material and inputting electronic data of the printed material as a comparison source image;

an extraction step of extracting a plurality of partial regions from the comparison source image;

a calculation step of calculating a distance between a center of one of the partial regions and a center of gravity of the source image as a first block distance and calculating a distance between a center of another partial regions and the center of gravity of the source image as a second block distance; and a search step of searching storage means for an image by using a distance ratio of the first block distance to the second block distance as a first search condition.

9. A computer-readable storage medium storing a program for making a computer execute similarity comparison processing of images, said program characterized by making the computer execute:

an input step of electronically scanning printed material and inputting electronic data of the printed material as a comparison source image;

an extraction step of extracting a plurality of partial regions from the comparison source image;

a calculation step of calculating a distance between a center of one of the partial regions and a center of gravity of the source image as a first block distance and calculating a distance between a center of another partial regions and the center of gravity of the source image as a second block distance; and a search step of searching storage means for an image by using a distance ratio of the first block distance to the second block distance as a first search condition.

* * * * *